(12) United States Patent
Richardson et al.

(10) Patent No.: US 10,731,333 B2
(45) Date of Patent: Aug. 4, 2020

(54) STRUCTURE-LINING APPARATUS WITH ADJUSTABLE WIDTH AND TOOL FOR SAME

(71) Applicant: CFS Concrete Forming Systems Inc., Vancouver (CA)

(72) Inventors: George David Richardson, Vancouver (CA); Semion Krivulin, Richmond (CA); Zi Li Fang, New Westminster (CA); Yue Heng Leung, Vancouver (CA)

(73) Assignee: CFS Concrete Forming Systems Inc., Vancouver (CA)

( * ) Notice: Subject to any disclaimer, the term of this patent is extended or adjusted under 35 U.S.C. 154(b) by 0 days.

(21) Appl. No.: 16/012,743

(22) Filed: Jun. 19, 2018

(65) Prior Publication Data

US 2019/0003175 A1 Jan. 3, 2019

Related U.S. Application Data

(63) Continuation of application No. PCT/CA2016/051548, filed on Dec. 29, 2016.
(Continued)

(51) Int. Cl.
*E04B 1/68* (2006.01)
*B26B 29/06* (2006.01)
(Continued)

(52) U.S. Cl.
CPC ............ *E04B 1/6815* (2013.01); *B26B 29/06* (2013.01); *B29C 70/68* (2013.01); *E04B 2/86* (2013.01);
(Continued)

(58) Field of Classification Search
CPC ........ E04B 1/6815; E04B 2/86; E04B 2/6835; E04B 2/8611; E04B 2/8623; E04C 1/40;
(Continued)

(56) References Cited

U.S. PATENT DOCUMENTS 154,179 A 8/1874 Hubert
374,826 A 12/1887 Clarke
(Continued)

FOREIGN PATENT DOCUMENTS

CA 0574720 5/1959
CA 0957816 11/1974
(Continued)

OTHER PUBLICATIONS

Vector Corrosion Technologies Marketing Materials, 2005.
(Continued)

*Primary Examiner* — Adriana Figueroa
(74) *Attorney, Agent, or Firm* — Todd A. Rattray, Oyen Wiggs Green & Mutala LLP

(57) ABSTRACT

A structure-lining apparatus for lining one or more surfaces of a structure formed from curable material cast in a form. The apparatus comprises a plurality of panels. The panels are connected at their respective edges in an edge-to-edge connection to provide a structure-lining surface. A plurality of anchoring components project from the panels into the liquid material during fabrication of the structure. The anchoring components each comprise one or more anchoring features which are encased in the material as the material solidifies to thereby bond the anchoring components to the structure. The plurality of anchoring components comprises one or more connector-type anchoring components for connecting to corresponding connector-type anchoring components on adjacent edges of a corresponding edge-adjacent panel to connect the edge-adjacent panels in an edge-
(Continued)

adjacent relationship. The apparatus comprises one or more breakaway components on at least one of the plurality of panels.

37 Claims, 19 Drawing Sheets

Related U.S. Application Data

(60) Provisional application No. 62/273,694, filed on Dec. 31, 2015.

(51) Int. Cl.
  *B29C 70/68* (2006.01)
  *E04B 2/86* (2006.01)
  *E04C 1/40* (2006.01)
  *B28B 23/00* (2006.01)

(52) U.S. Cl.
  CPC ............. *E04B 2/8635* (2013.01); *E04C 1/40* (2013.01); *B28B 23/005* (2013.01)

(58) Field of Classification Search
  CPC ........ B26B 29/06; B28B 23/005; E04F 13/08; E04F 13/26; E04F 13/28; E04F 13/0862
  See application file for complete search history.

(56) References Cited

U.S. PATENT DOCUMENTS

| | | |
|---|---|---|
| 510,720 A | 12/1893 | Stewart, Jr. |
| 820,246 A | 5/1906 | Nidds |
| 3,545,152 A | 12/1907 | Knohl |
| 1,035,206 A | 8/1912 | Lewen |
| 1,080,221 A | 12/1913 | Jester |
| 1,175,168 A | 3/1916 | Moulton |
| 1,244,608 A | 10/1917 | Hicks |
| 1,276,147 A | 8/1918 | White |
| 1,345,156 A | 6/1920 | Flynn |
| 1,423,879 A | 7/1922 | Potter |
| 1,540,570 A | 6/1925 | Roberts |
| 1,637,410 A | 8/1927 | Corybell |
| 1,653,197 A | 12/1927 | Barnes |
| 1,715,466 A | 6/1929 | Miller |
| 1,820,897 A | 8/1931 | White et al. |
| 1,875,242 A | 8/1932 | Hathaway |
| 1,915,611 A | 6/1933 | Miller |
| 1,963,153 A | 6/1934 | Schmieder |
| 2,008,162 A | 7/1935 | Waddell |
| 2,050,258 A | 8/1936 | Bemis |
| 2,059,483 A | 11/1936 | Parsons |
| 2,076,472 A | 4/1937 | London |
| 2,164,681 A | 7/1939 | Fould |
| 2,172,052 A | 9/1939 | Robbins |
| 2,314,448 A | 3/1943 | Hoggatt |
| 2,326,361 A | 8/1943 | Jacobsen |
| 2,354,485 A | 7/1944 | Slaughter |
| 2,845,685 A | 8/1958 | Lovgren et al. |
| 2,861,277 A | 11/1958 | Hermann |
| 2,871,619 A | 2/1959 | Walters |
| 2,892,340 A | 6/1959 | Fort |
| 2,928,115 A | 3/1960 | Hill |
| 3,063,122 A | 11/1962 | Katz |
| 3,100,677 A | 8/1963 | Frank et al. |
| 3,152,354 A | 10/1964 | Diack |
| 3,184,013 A | 5/1965 | Pavlecka |
| 3,196,990 A | 7/1965 | Handley |
| 3,199,258 A * | 8/1965 | Jentoft .................... E04B 2/962 52/222 |
| 3,220,151 A | 11/1965 | Goldman |
| 3,242,834 A | 3/1966 | Sondheim |
| 3,288,427 A | 11/1966 | Pluckebaum |
| 3,291,437 A | 12/1966 | Bowden et al. |
| 3,321,884 A | 5/1967 | Klaue |
| 3,468,088 A | 9/1969 | Miller |
| 3,555,751 A | 1/1971 | Thorgusen |
| 3,588,027 A | 6/1971 | Bowden |
| 3,682,434 A | 8/1972 | Boenig |
| 3,769,769 A | 11/1973 | Kohl |
| 3,788,020 A | 1/1974 | Gregori |
| 3,822,557 A | 7/1974 | Frederick |
| 3,886,705 A | 6/1975 | Cornland |
| 3,951,294 A | 4/1976 | Wilson |
| 3,959,940 A | 6/1976 | Ramberg |
| 3,991,636 A | 11/1976 | Devillers |
| 4,023,374 A | 5/1977 | Colbert et al. |
| 4,060,945 A | 12/1977 | Wilson |
| 4,104,837 A | 8/1978 | Naito |
| 4,106,233 A | 8/1978 | Horowitz |
| 4,114,388 A | 9/1978 | Straub |
| 4,162,640 A | 7/1979 | Arnold |
| 4,180,956 A | 1/1980 | Gross |
| 4,182,087 A | 1/1980 | Schall et al. |
| 4,193,243 A | 3/1980 | Tiner |
| 4,276,730 A | 7/1981 | Lewis |
| 4,299,070 A | 11/1981 | Oltmanns et al. |
| 4,332,119 A * | 6/1982 | Toews ....................... E04B 2/72 52/481.1 |
| 4,351,870 A | 9/1982 | English |
| 4,383,674 A | 5/1983 | Fricker |
| 4,385,850 A | 5/1983 | Bobath |
| 4,386,543 A | 6/1983 | Walker, Jr. |
| 4,430,831 A | 2/1984 | Kemp |
| 4,433,522 A | 2/1984 | Yerushalmi |
| 4,434,597 A | 3/1984 | Fischer |
| 4,508,310 A | 4/1985 | Schultz |
| 4,532,745 A | 8/1985 | Kinard |
| 4,543,764 A | 10/1985 | Kozikowski |
| 4,550,539 A | 11/1985 | Foster |
| 4,553,875 A | 11/1985 | Casey |
| 4,575,985 A | 3/1986 | Eckenrodt |
| 4,581,864 A | 4/1986 | Shvakhman et al. |
| 4,606,167 A | 8/1986 | Thorne |
| 4,633,558 A | 1/1987 | Spaulding |
| 4,664,560 A | 5/1987 | Cortlever |
| 4,695,033 A | 9/1987 | Imaeda et al. |
| 4,703,602 A | 11/1987 | Pardo |
| 4,731,964 A | 3/1988 | Phillips |
| 4,736,563 A | 4/1988 | Bilhorn |
| 4,731,971 A | 5/1988 | Terkl |
| 4,742,665 A | 5/1988 | Baierl |
| 4,754,668 A | 7/1988 | Oetiker |
| 4,808,039 A | 2/1989 | Fischer |
| 4,856,754 A | 8/1989 | Yokota et al. |
| 4,866,891 A | 9/1989 | Young |
| 4,930,282 A | 6/1990 | Meadows |
| 4,946,056 A | 8/1990 | Stannard |
| 4,995,191 A | 2/1991 | Davis |
| 5,014,480 A | 5/1991 | Guarriello et al. |
| 5,028,368 A | 7/1991 | Grau |
| 5,058,855 A | 10/1991 | Ward |
| 5,078,360 A | 1/1992 | Spera |
| 5,106,233 A | 4/1992 | Breaux |
| 5,124,102 A | 6/1992 | Serafini |
| 5,187,843 A | 2/1993 | Lynch |
| 5,216,863 A | 6/1993 | Nessa et al. |
| 5,243,805 A | 9/1993 | Fricker |
| 5,247,773 A | 9/1993 | Weir |
| 5,265,750 A | 11/1993 | Whiteley |
| 5,292,208 A | 3/1994 | Berger |
| 5,311,718 A | 5/1994 | Trousilek |
| 5,465,545 A | 11/1995 | Trousilek |
| 5,489,468 A | 2/1996 | Davidson |
| 5,491,947 A | 2/1996 | Kim |
| 5,513,474 A | 5/1996 | Scharkowski |
| 5,516,863 A | 5/1996 | Abusleme et al. |
| 5,553,430 A | 9/1996 | Majnaric et al. |
| 5,591,265 A | 1/1997 | Tusch |
| 5,608,999 A | 3/1997 | McNamara |
| 5,625,989 A | 5/1997 | Brubaker et al. |
| 5,714,045 A | 2/1998 | Lasa et al. |
| 5,729,944 A | 3/1998 | De Zen |
| 5,735,097 A | 4/1998 | Cheyne |

(56) References Cited

U.S. PATENT DOCUMENTS

| | | |
|---|---|---|
| 5,740,648 A | 4/1998 | Piccone |
| 5,747,134 A | 5/1998 | Mohammed et al. |
| 5,791,103 A | 8/1998 | Coolman |
| 5,824,347 A | 10/1998 | Serafini |
| 5,860,262 A | 1/1999 | Johnson |
| 5,953,880 A | 9/1999 | De Zen |
| 5,987,830 A | 11/1999 | Worley |
| 6,053,666 A | 4/2000 | Irvine et al. |
| 6,151,856 A | 11/2000 | Shimonohara |
| 6,161,989 A | 12/2000 | Kotani et al. |
| 6,167,669 B1 | 1/2001 | Lanc |
| 6,167,672 B1 | 1/2001 | Okitomo |
| 6,178,711 B1 | 1/2001 | Laird et al. |
| 6,185,884 B1 | 2/2001 | Myers et al. |
| 6,189,269 B1 | 2/2001 | De Zen |
| 6,209,278 B1 | 4/2001 | Tychsen |
| 6,212,845 B1 | 4/2001 | De Zen |
| 6,219,984 B1 | 4/2001 | Piccone |
| 6,220,779 B1* | 4/2001 | Warner ............... B29C 65/58 403/381 |
| 6,226,950 B1* | 5/2001 | Davis ................. C08L 23/10 52/100 |
| 6,247,280 B1 | 6/2001 | Grinshpun et al. |
| 6,286,281 B1* | 9/2001 | Johnson ............. B29C 70/525 52/309.9 |
| 6,293,067 B1 | 9/2001 | Meendering et al. |
| 6,357,196 B1* | 3/2002 | McCombs .............. E04C 3/14 138/166 |
| 6,378,261 B1 | 4/2002 | Agsten |
| 6,387,309 B1 | 5/2002 | Kojima |
| 6,405,508 B1 | 6/2002 | Janesky |
| 6,435,470 B1 | 8/2002 | Lahham et al. |
| 6,435,471 B1 | 8/2002 | Piccone |
| 6,438,918 B2 | 8/2002 | Moore et al. |
| 6,467,136 B1* | 10/2002 | Graham ............. A44B 11/2592 24/31 R |
| 6,530,185 B1 | 3/2003 | Scott et al. |
| 6,539,643 B1* | 4/2003 | Gleeson ............... E04C 2/043 33/1 B |
| 6,550,194 B2 | 4/2003 | Jackson et al. |
| 6,588,165 B1 | 7/2003 | Wright |
| 6,622,452 B2 | 9/2003 | Alvaro |
| 6,647,689 B2 | 11/2003 | Pletzer et al. |
| 6,691,976 B2 | 2/2004 | Myers et al. |
| 6,694,692 B2 | 2/2004 | Piccone |
| 6,832,456 B1 | 12/2004 | Bilowol |
| 6,866,445 B2 | 3/2005 | Semler |
| 6,935,081 B2 | 8/2005 | Dunn et al. |
| 7,320,201 B2 | 1/2008 | Kitchen et al. |
| 7,444,788 B2 | 11/2008 | Morin et al. |
| 7,818,936 B2 | 10/2010 | Morin et al. |
| 8,074,418 B2 | 12/2011 | Thiagarajan et al. |
| 8,485,493 B2 | 7/2013 | Wells et al. |
| 8,555,590 B2* | 10/2013 | Richardson .......... E04B 2/8641 52/426 |
| 8,707,648 B2 | 4/2014 | Timko et al. |
| 8,769,904 B1 | 7/2014 | Brandt et al. |
| 8,793,953 B2* | 8/2014 | Richardson .......... E04B 1/6116 52/422 |
| 8,806,839 B2 | 8/2014 | Zhou |
| 8,859,898 B2 | 10/2014 | Frye |
| 8,881,483 B2 | 11/2014 | Caboni |
| 8,959,871 B2 | 2/2015 | Parenti et al. |
| 8,992,131 B2 | 3/2015 | Castonguay et al. |
| 9,206,614 B2* | 12/2015 | Richardson .......... E04B 2/8635 |
| 9,441,365 B2 | 9/2016 | Richardson et al. |
| 9,453,345 B2* | 9/2016 | Richardson ......... E04G 23/0218 |
| 9,850,658 B2 | 12/2017 | Alcala Ordaz |
| 9,913,083 B2 | 3/2018 | Rosendahl |
| 9,993,340 B2 | 6/2018 | Foroni et al. |
| 2003/0005659 A1 | 1/2003 | Moore, Jr. |
| 2003/0085482 A1 | 5/2003 | Sincock et al. |
| 2003/0155683 A1 | 8/2003 | Pietrobon |
| 2004/0010994 A1 | 1/2004 | Piccone |
| 2004/0020149 A1 | 2/2004 | Messiqua |
| 2004/0093817 A1 | 5/2004 | Pujol Barcons |
| 2004/0216408 A1 | 11/2004 | Hohmann, Jr. |
| 2005/0016083 A1 | 1/2005 | Morin et al. |
| 2005/0016103 A1* | 1/2005 | Piccone ............... E04B 2/8641 52/481.1 |
| 2006/0179762 A1 | 8/2006 | Thome et al. |
| 2006/0185270 A1* | 8/2006 | Handley ............... E04C 3/30 52/169.14 |
| 2006/0185291 A1 | 8/2006 | Mathe |
| 2006/0213140 A1 | 9/2006 | Morin et al. |
| 2007/0028544 A1 | 2/2007 | Messiqua et al. |
| 2007/0107341 A1 | 5/2007 | Zhu |
| 2007/0193169 A1 | 8/2007 | Emblin |
| 2008/0163664 A1 | 7/2008 | Battenfeld |
| 2008/0168734 A1 | 7/2008 | Degen et al. |
| 2009/0120027 A1 | 5/2009 | Amend |
| 2009/0229214 A1 | 8/2009 | Nelson |
| 2009/0269130 A1 | 10/2009 | Williams |
| 2010/0047608 A1 | 2/2010 | Seccombe |
| 2010/0050552 A1 | 3/2010 | Richardson et al. |
| 2010/0071304 A1 | 3/2010 | Richardson et al. |
| 2010/0251657 A1 | 10/2010 | Richardson et al. |
| 2010/0275547 A1 | 11/2010 | Kamata |
| 2010/0325984 A1 | 12/2010 | Richardson et al. |
| 2011/0000161 A1 | 1/2011 | Aube |
| 2011/0099932 A1 | 5/2011 | Saulce |
| 2011/0131914 A1 | 6/2011 | Richardson et al. |
| 2011/0277410 A1 | 11/2011 | Richardson |
| 2012/0014745 A1 | 1/2012 | Rosendahl |
| 2012/0056344 A1 | 3/2012 | Richardson et al. |
| 2012/0121337 A1 | 5/2012 | Richardson et al. |
| 2013/0081345 A1 | 4/2013 | Sheehy |
| 2016/0289960 A1 | 10/2016 | Darwell |

FOREIGN PATENT DOCUMENTS

| | | |
|---|---|---|
| CA | 1316366 | 4/1993 |
| CA | 2097226 | 11/1994 |
| CA | 2141463 | 8/1996 |
| CA | 2070079 | 6/1997 |
| CA | 2170681 | 8/1997 |
| CA | 2218600 | 6/1998 |
| CA | 2215939 | 8/1999 |
| CA | 2226497 | 10/1999 |
| CA | 2243905 | 1/2000 |
| CA | 2255256 | 1/2000 |
| CA | 2244537 | 2/2000 |
| CA | 2418885 | 8/2003 |
| CA | 2502343 | 5/2004 |
| CA | 2502392 | 5/2004 |
| CA | 2499450 | 9/2005 |
| CA | 2577217 | 1/2006 |
| CA | 2629202 | 4/2008 |
| CA | 2716118 | 8/2008 |
| CA | 2681963 | 10/2008 |
| CA | 2751134 | 12/2011 |
| CA | 2855742 | 5/2013 |
| CA | 2810538 | 9/2014 |
| CH | 317758 | 1/1957 |
| CH | 669235 | 2/1989 |
| CN | 2529936 | 1/2003 |
| DE | 1684357 | 4/1967 |
| DE | 1812590 | 6/1970 |
| DE | 2062723 | 8/1972 |
| DE | 3003446 | 8/1981 |
| DE | 3234489 | 3/1984 |
| DE | 3727956 | 5/1988 |
| DE | 29803155 | 6/1998 |
| EP | 0025420 | 3/1981 |
| EP | 0055504 | 7/1982 |
| EP | 0141782 | 5/1985 |
| EP | 0179046 | 4/1986 |
| EP | 0757137 | 2/1997 |
| EP | 2169133 | 3/2010 |
| FR | 0507787 | 7/1920 |
| FR | 1381945 | 11/1964 |
| FR | 1603005 | 4/1971 |
| FR | 2364314 | 4/1978 |

(56) References Cited

FOREIGN PATENT DOCUMENTS

| | | |
|---|---|---|
| FR | 2535417 | 5/1984 |
| FR | 2721054 | 6/1994 |
| FR | 2717848 | 9/1995 |
| FR | 2669364 | 3/2012 |
| GB | 137221 | 1/1920 |
| GB | 779916 | 7/1957 |
| GB | 1243173 | 8/1971 |
| GB | 1253447 | 11/1971 |
| GB | 2141661 | 1/1985 |
| GB | 2205624 | 12/1988 |
| JP | 05133028 | 5/1993 |
| JP | 0904162 | 2/1997 |
| JP | 2008223335 | 9/2008 |
| SE | 206538 | 8/1966 |
| WO | 8204088 | 11/1982 |
| WO | 9500724 | 1/1995 |
| WO | 9607799 | 3/1996 |
| WO | 9635845 | 11/1996 |
| WO | 9743496 | 11/1997 |
| WO | 0163066 | 8/2001 |
| WO | 0173240 | 10/2001 |
| WO | 03006760 | 1/2003 |
| WO | 2004088064 | 10/2004 |
| WO | 2005040526 | 5/2005 |
| WO | 2008074926 | 6/2008 |
| WO | 2008119178 | 10/2008 |
| WO | 2009059410 | 5/2009 |
| WO | 2009092158 | 7/2009 |
| WO | 2010012061 | 2/2010 |
| WO | 2010037211 | 4/2010 |
| WO | 2010078645 | 7/2010 |
| WO | 2010094111 | 8/2010 |
| WO | 2012003587 | 1/2012 |
| WO | 2013075250 | 5/2013 |
| WO | 2013102274 | 7/2013 |
| WO | 2013102275 | 7/2013 |
| WO | 2013177715 | 12/2013 |
| WO | 2013188980 | 12/2013 |
| WO | 2014121337 | 8/2014 |
| WO | 2015081445 | 6/2015 |
| WO | 2015149187 | 10/2015 |

OTHER PUBLICATIONS

Vector Corrosion Technologies Marketing Materials, 2007.
Vector Corrosion Technologies Marketing Materials, 2008.
Digigraph Brochure, Building Systems using PVC extrusions and concrete, accessed online Jan. 2012.
Digigraph Guide, Digigraph Systems Inc., Installation Guide for the Digigraph Construction System Composed of PVC Extrusions and Concrete, accessed online Jan. 2012.
The Digigraph System, http://www.digigraph-housing.com/web/system.ht, accessed online Jan. 2012.

* cited by examiner

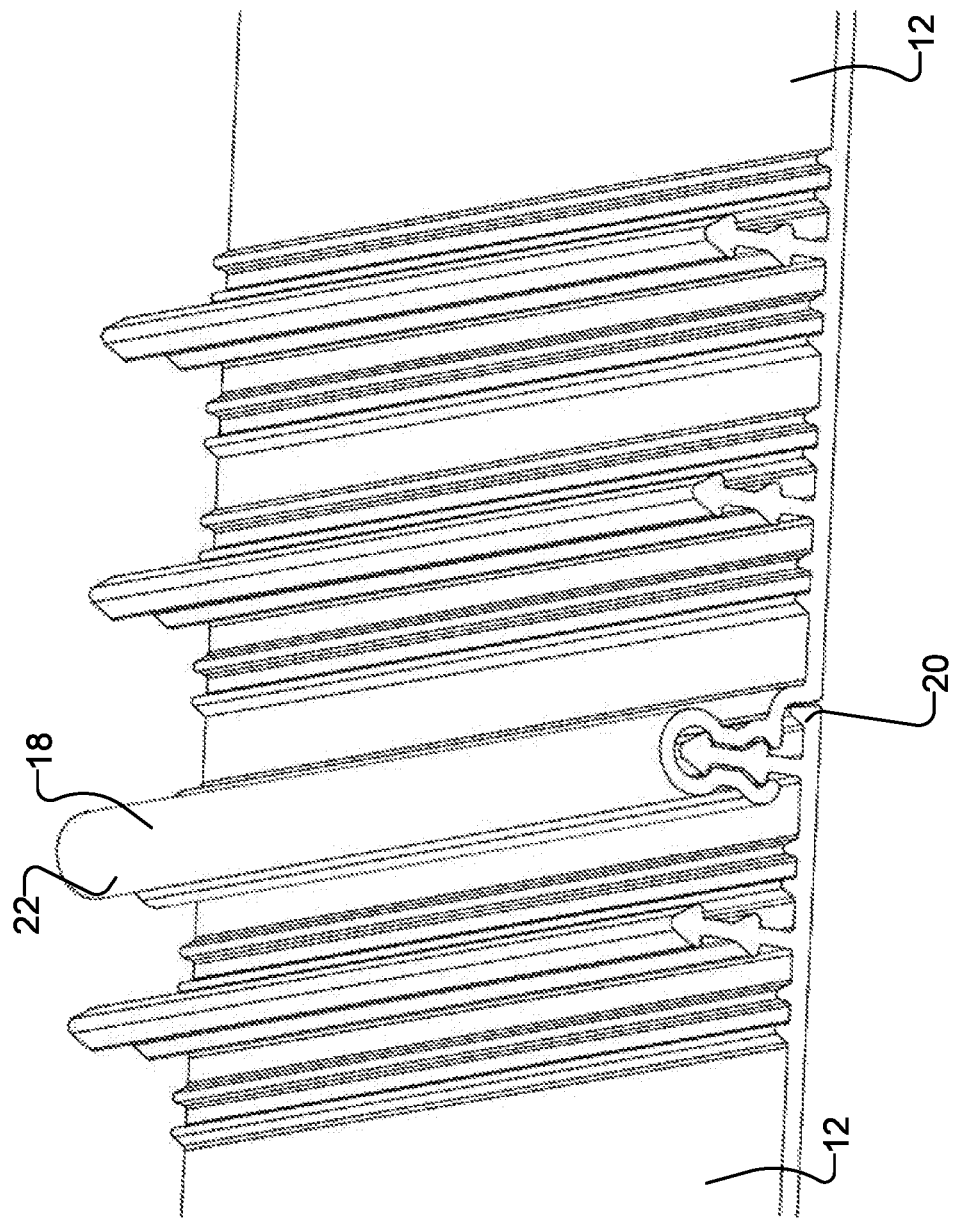

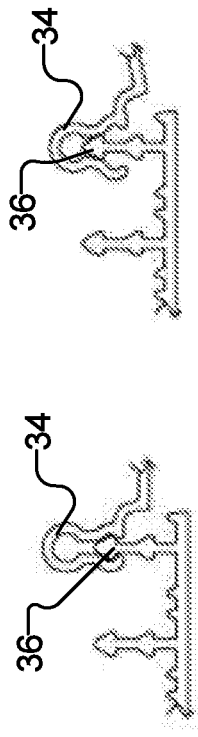
FIG. 5A
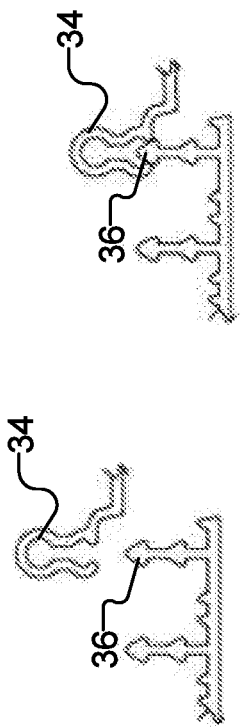
FIG. 5B
FIG. 5C
FIG. 5D
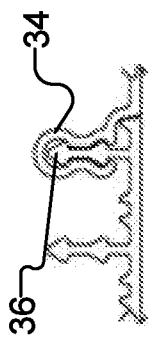
FIG. 5E
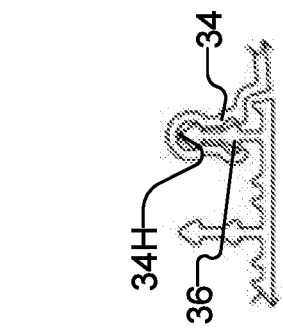
FIG. 5F
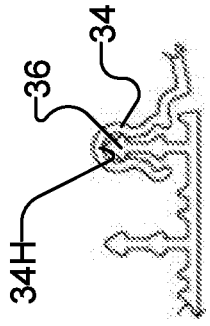
FIG. 5G

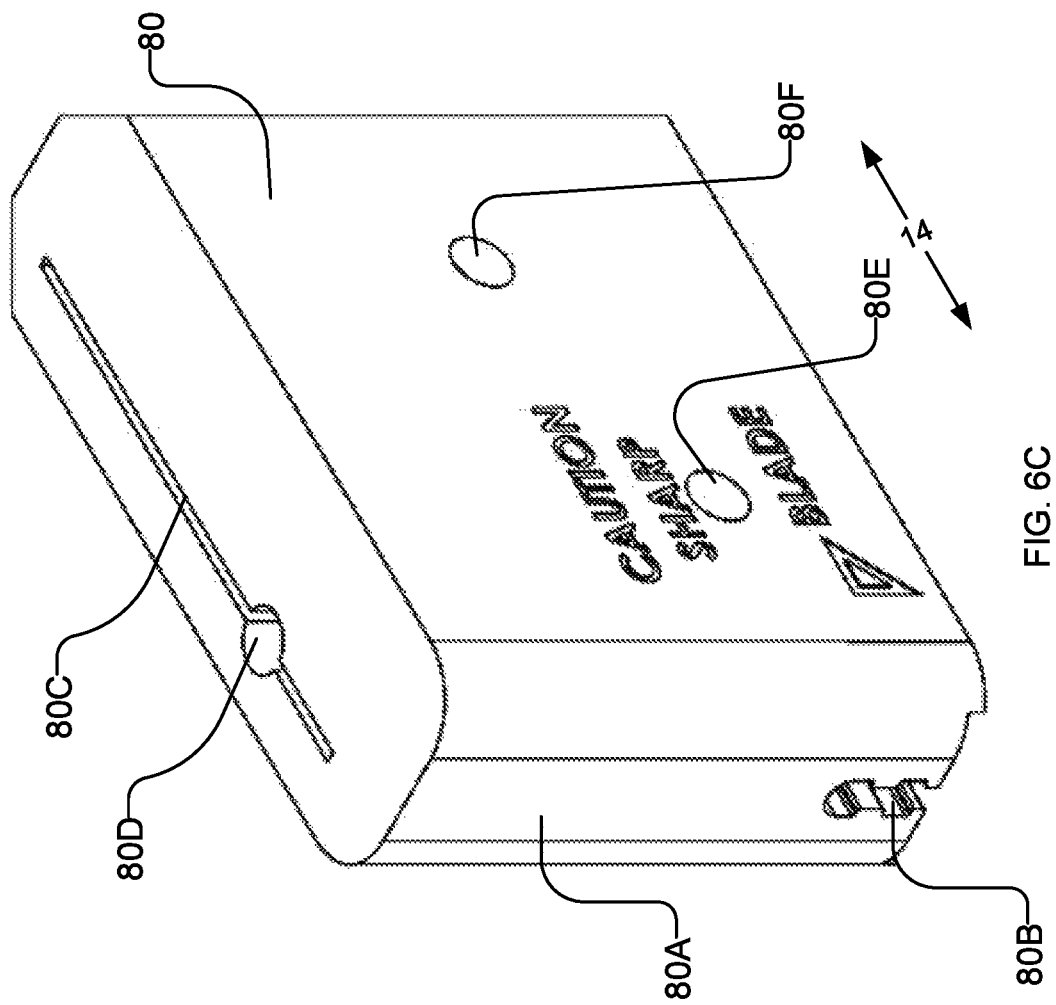
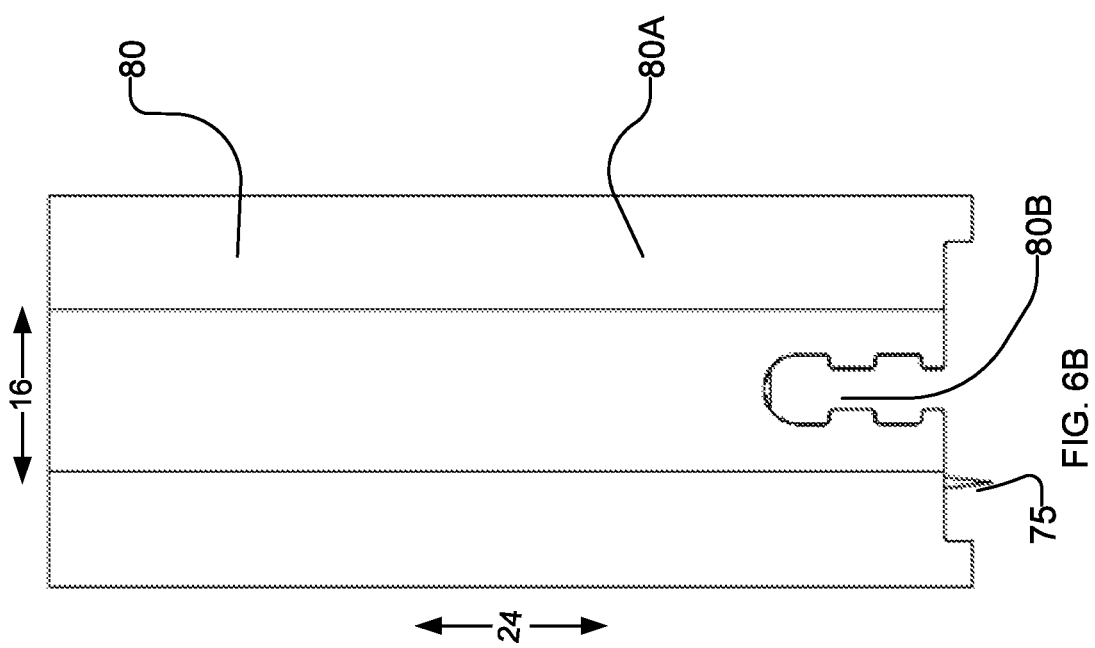

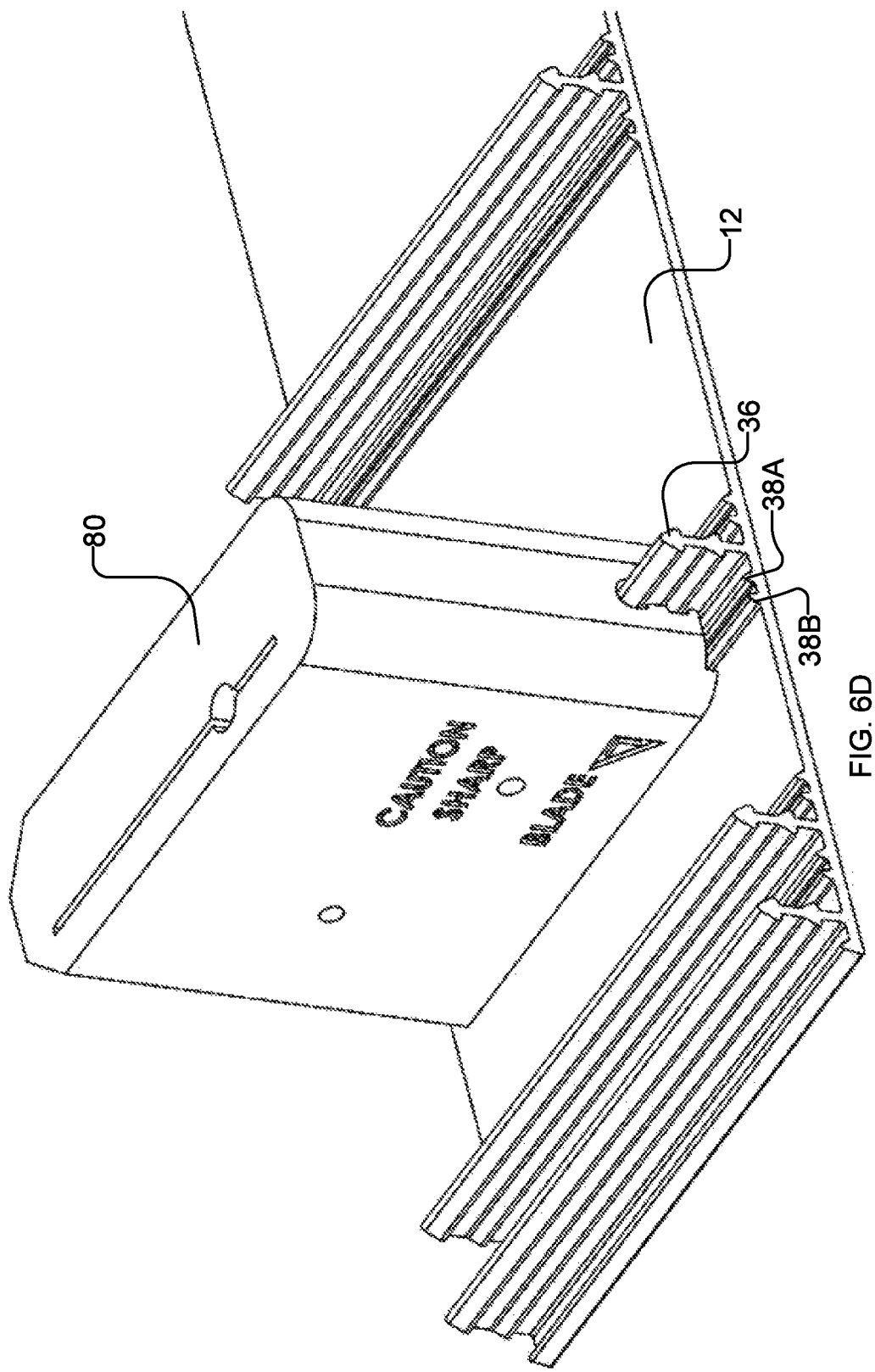

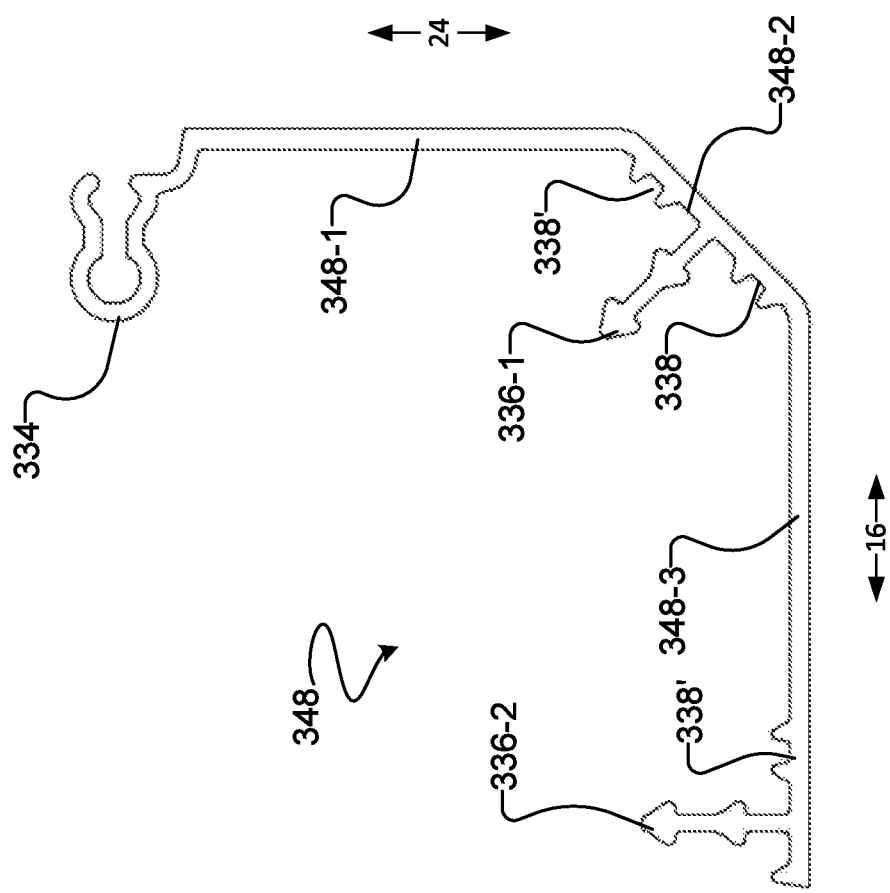

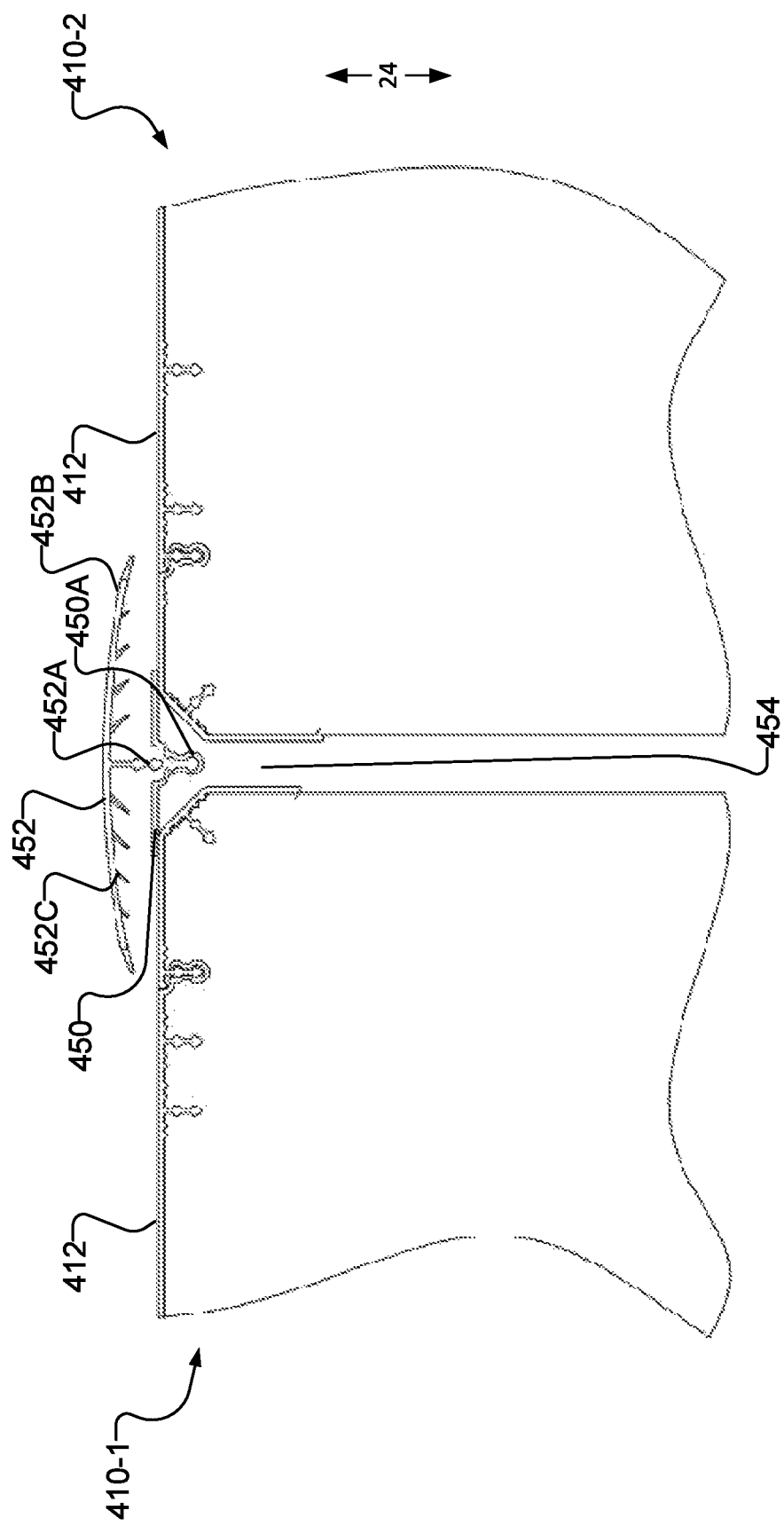

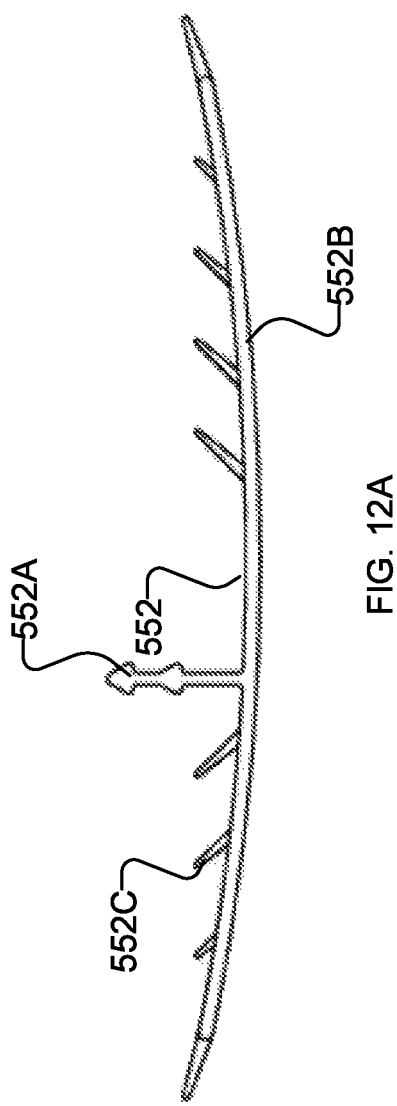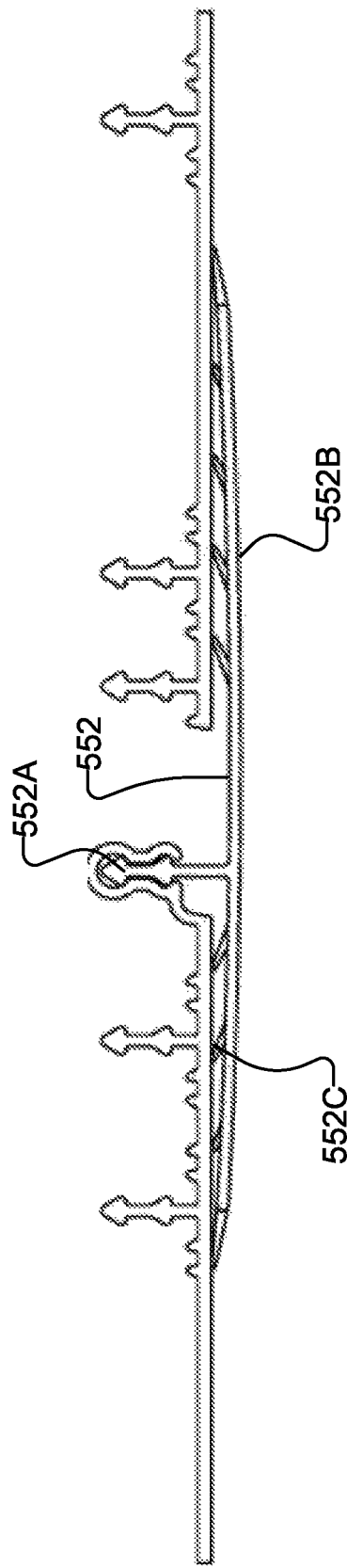

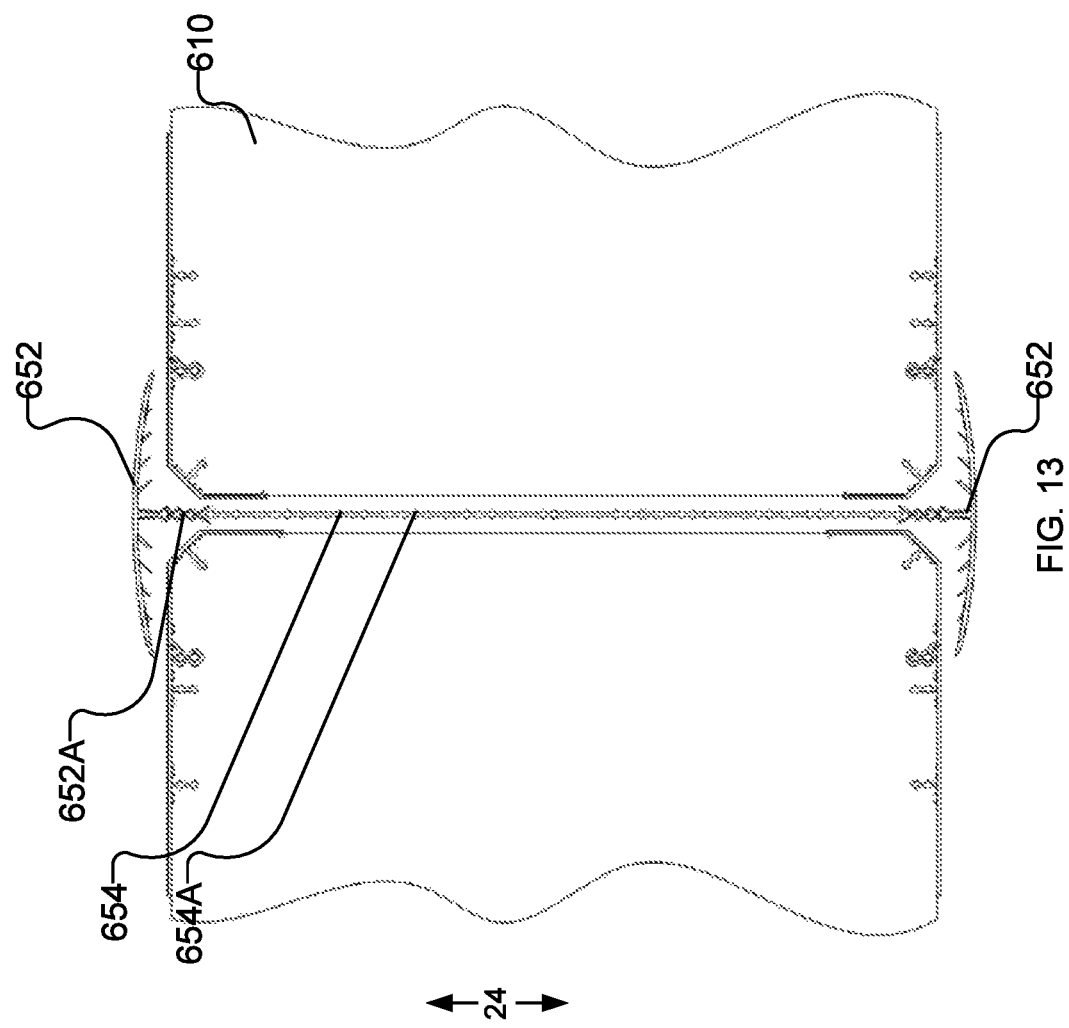

STRUCTURE-LINING APPARATUS WITH ADJUSTABLE WIDTH AND TOOL FOR SAME

RELATED APPLICATIONS

This application is a continuation of PCT international application No. PCT/CA2016/051548 which has an international filing date of 29 Dec. 2016 and claims priority from U.S. application No. 62/273,694 filed on 31 Dec. 2015. PCT application No. PCT/CA2016/051548 and U.S. application No. 62/273,694 are both hereby incorporated herein by reference.

TECHNICAL FIELD

The invention disclosed herein relates to fabricating structures from concrete and similar curable materials. Particular embodiments of the invention provide methods and apparatus for providing linings on the surfaces of concrete structures during fabrication thereof. Such concrete structures may include, without limitation, walls for building structures or the like.

BACKGROUND

It is known to make a wide variety of structures from concrete. By way of non-limiting example, such structures may include walls (e.g. for buildings, tanks or other storage containers), structural components (e.g. supports for bridges, buildings or elevated transportation systems), tunnels or the like.

In many applications, the concrete used to make such structures is unsuitable or undesirable as a surface of the structure or it is otherwise desired to line one or more surfaces of the structure with material other than concrete.

By way of non-limiting example, consider the use of concrete to form tilt-up walls. Concrete tilt-up walls are typically formed in a generally horizontal plane (e.g. on a horizontal table) and then tilted to a generally vertical plane. A form is created on the table by suitably fastening form-work members to the table such that the form-work members extend upwardly from the horizontal surface of the table. Concrete is then poured into the form. The form-work members (including the horizontal surface of the table) retain the liquid concrete in the desired shape. Concrete, prior to curing, or other curable material, prior to curing, may be described herein as being liquid, liquid concrete or liquid material for brevity. It will be appreciated by those skilled in the art that concrete, prior to curing, or other curable material, prior to curing, need not be a homogeneous liquid and may comprise solid particles within a mixture exhibiting liquid characteristics in contrast with cured concrete or cured material, which is a solid. Some tables are configured to vibrate to assist with an even distribution of liquid concrete. When the concrete solidifies, the concrete structure is hoisted from the form and tilted from the generally horizontal orientation of the table into a generally vertical orientation by a crane, a suitably configured winching apparatus or the like.

A drawback with prior art tilt-up walls is that all of the surfaces of the wall are bare concrete. Bare concrete surfaces have a number of limitations. Bare concrete may be aesthetically unpleasing. Consequently, prior tilt-up walls may not be suitable for certain applications where there is a desire to have an aesthetically pleasing finished surface on the walls. In addition, bare concrete typically has a somewhat porous or otherwise non-smooth surface which is difficult to clean and which provides spaces for dirt to accumulate and bacteria and other organisms to grow. Consequently, prior art tilt-up walls may not be suitable for certain applications where there is a desire to provide a sanitary environment. Bare concrete may be susceptible to degradation or damage from exposure to various chemicals or conditions, such as, by way of non-limiting example, salt, various acids, animal excrement and whey. Consequently, prior art tilt-up walls may not be suitable for certain applications where the wall might be exposed to such chemicals.

Various apparatus and methods for lining concrete structures/walls exist. However, due to the widely varying shapes and sizes of concrete structures/walls, prior art concrete liners must be custom designed and fabricated for each application.

There is a general desire for efficient methods and apparatus for lining one or more surfaces of concrete structures with material other than concrete, without having to custom design and fabricate a lining for each application.

SUMMARY

The following embodiments and aspects thereof are described and illustrated in conjunction with apparatus and methods which are meant to be exemplary and illustrate, not limiting in scope. In various embodiments, one or more of the above-described problems have been reduced or eliminated, while other embodiments are directed to other improvements.

One aspect of the invention provides a structure-lining apparatus for lining one or more surfaces of a structure formed from curable material cast in a form. The apparatus comprises a plurality of panels which extend in substantially orthogonal transverse and longitudinal directions and the panels are connectable at their respective transverse edges in an edge-to-edge connection to provide a structure-lining surface. A first panel of the plurality of panels comprises a first connector component on a first transverse edge of the first panel, a second connector component, complementary to the first connector component, on a second transverse edge of the first panel, a third connector component, complementary to the first connector component, between the first and second transverse edges of the first panel, and a first breakaway component between the second connector component and the third connector component for shortening a transverse length of the first panel. A second panel of the plurality of panels is edge-adjacent to the first panel and is connectable in an edge-to-edge connection to the first panel by a first complementary connector component that is complementary to the first connector component of the first panel or a second complementary connector component that is complementary to the second and third connector components of the first panel.

Another aspect of the invention provides a method for lining one or more surfaces of a structure formed from material that is cast as a liquid and subsequently solidifies. The method comprises providing a form in which to cast the material and providing a first and second panels which extend in substantially orthogonal transverse and longitudinal directions. A transverse dimension of the first panel is shortened by breaking a first breakaway component of the first panel, wherein shortening a transverse dimension of the first panel comprises creating a new transverse edge of the first panel. The first panel is connected to the second panel in an edge-to-edge connection at the new transverse edge of the first panel and an edge-adjacent transverse edge of the second panel to provide a structure lining surface. The first and second panels are inserted into the form such that at least a portion of the structure lining surface abuts against a corresponding portion of the form and liquid material is introduced into the form.

Another aspect of the invention provides a method for providing a stay-in-place formwork for casting a curved structure from concrete or other curable construction material. The method comprises providing a plurality of panels and connecting a first subset of the plurality of panels in edge-adjacent relationships to form an outer surface, wherein the first subset of panels comprising a first number of panels. The first subset of panels are deformed such that the outer surface exhibits a first radius of curvature. One or more panels of a second subset of the plurality of panels are trimmed the second subset of panels comprises a second number of panels and the one or more panels are trimmed by a combined transverse length. The second subset of panels are connected in edge-adjacent relationships to form an inner surface. The second subset of panels are deformed such that the inner surface exhibits a second radius of curvature, r2, smaller than the first radius of curvature. The inner and outer surfaces are spaced apart to form a space therebetween and at least a portion of the space is filled with concrete or other curable construction material.

Another aspect of the invention provides a tool for cutting one or more panels of a structure-lining apparatus comprising a plurality of panels connected at their respective transverse edges in an edge-to-edge connection to provide a structure-lining surface. The tool comprises a body comprising a longitudinally extending channel for slidingly receiving a longitudinally extending member of one of the one or more panels and thereby forming a connection between the tool and the one of the one or more panels. A longitudinally extending blade protrudes from the body in an inward-outward direction, at a location transversely spaced apart from the channel, such that the blade cuts at least partly through a thickness of the one of the one or more panels as the tool is slid along the longitudinally extending member of the one of the one or more panels.

Another aspect of the invention provides a method for cutting one or more panels of a structure-lining apparatus comprising a plurality of panels connected at their respective transverse edges in an edge-to-edge connection to provide a structure-lining surface. The method comprises providing a tool, the tool comprising a body and a longitudinally extending blade protruding from the body in an inward-outward direction, engaging a longitudinally extending channel of the tool on a longitudinally extending member of one of the one or more panels and thereby forming a connection between the tool and the one of the one or more panels; abutting the blade against a portion of the one of the one or more panels, and cutting the one of the one or more panels by sliding the tool along the longitudinally extending member.

In addition to the exemplary aspects and embodiments described above, further aspects and embodiments will become apparent by reference to following detailed description and study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1A is an expanded isometric view of the structure lining apparatus of FIG. 1.

FIGS. 5A to 5G are plan views of different stages of a panel-to-panel connection being formed according to a particular non-limiting embodiment of the invention.

FIG. 6B is a front profile view of a tool for cutting or scoring a panel according to a particular non-limiting embodiment of the invention.

FIG. 6C is an isometric view of the tool of FIG. 6B.

FIG. 6D is an isometric view of tool of FIG. 6B engaged with a panel according to a particular non-limiting embodiment of the invention.

FIG. 10 is a plan view of a corner piece according to a particular non-limiting embodiment of the invention.

FIG. 11 is a plan view of a structure according to a particular non-limiting embodiment of the invention.

FIGS. 12A and 12B are plan views of a joint cover according to a particular non-limiting embodiment of the invention.

FIG. 13 is a plan view of a joint cover according to a particular non-limiting embodiment of the invention.

DESCRIPTION

Figure 1:
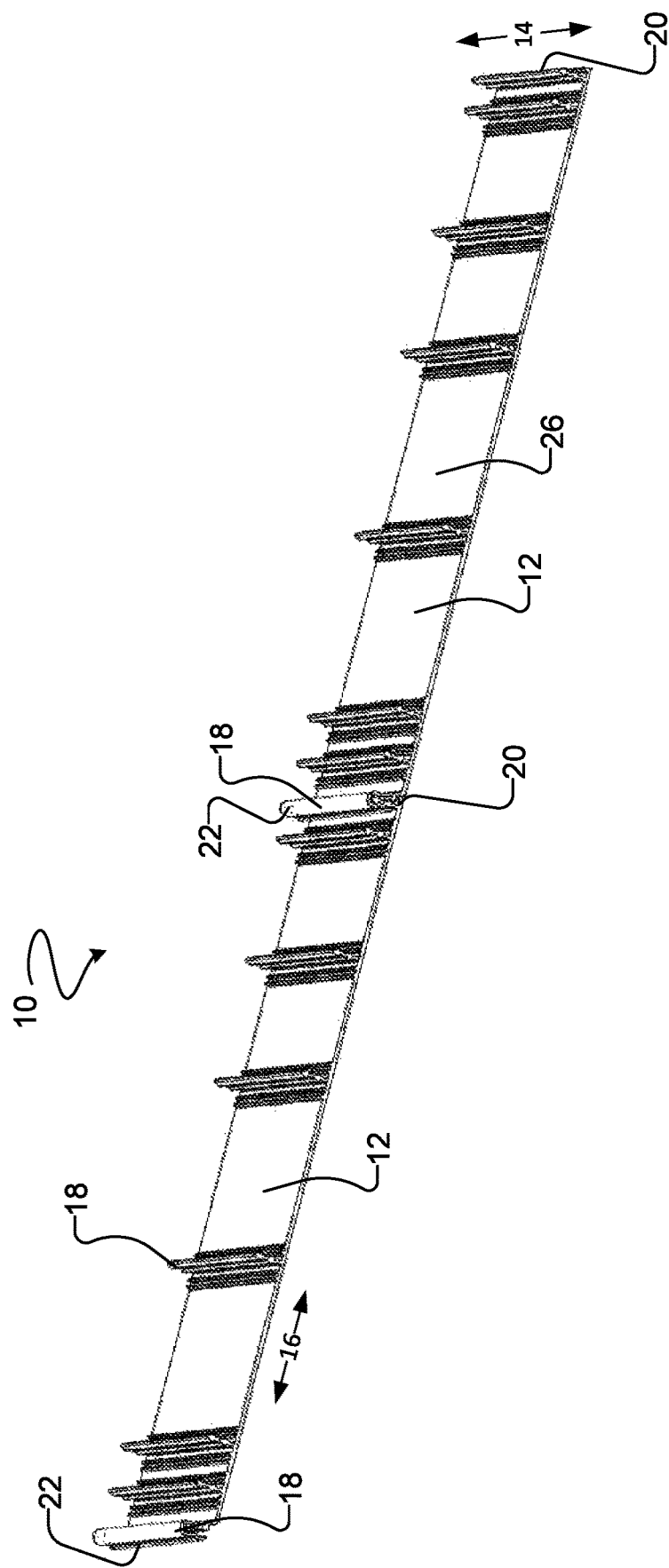
FIG. 1 is an isometric view of a portion of a structure lining apparatus 10 according to a particular non-limiting embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular aspects of the invention provide modular methods and apparatus for lining one or more surfaces of concrete structures during fabrication thereof. In particular embodiments, a portion of a structural form is lined with a structure-lining apparatus comprising a plurality of structure-lining panels and a plurality of panel-to-panel connector components. The panels, which may extend in longitudinal and transverse directions, are interconnected to one another in edge-to-edge relationship at their transverse edges, by the panel-to-panel connector components, to line at least a portion of the structural form. The panel-to-panel connector components extend in an inward-outward direction from the panels. The panel-to-panel connector components may: be integrally formed with the panels; connect to the panels via suitably configured connector components; and/or comprise concrete-anchoring components. The panel-to-panel connector components extend in the inward-outward direction and may comprise features which may extend in the longitudinal and transverse directions (e.g. in a plane parallel to the panels) to provide connectors and/or concrete-anchoring surfaces. In particular embodiments, the connecting and/or concrete-anchoring features comprise a stem which extends in the inward-outward and longitudinal directions and, at a distance spaced apart from the panels in the inward-outward direction, one or more arrowheads which extend in the longitudinal and/or transverse directions to provide connecting and/or anchoring surfaces. Concrete is then poured into the form on an interior of the lining panels and allowed to solidify in the form. As the concrete solidifies, the concrete-anchoring components may bond the lining panels to the resultant concrete structure.

One particular non-limiting example of a concrete structure which may be lined in accordance with the invention is a wall structure—e.g. a tilt-up wall structure or a pre-cast wall structure. A structural form may be assembled on a table or a similar horizontal surface. In particular embodiments, a structure-lining apparatus (e.g. wall-lining apparatus) is assembled and placed within the form to cover at least a portion of the table surface. The wall-lining apparatus comprises a plurality of longitudinally and transversely extending panels connected to one another at their transverse edges to form a wall-lining surface. Before or after interconnection with one another, the panels may be laid atop the generally horizontal table surface. In some embodiments, the wall-lining apparatus may be made to cover other surface(s) of the form as well. The wall-lining apparatus also comprises a plurality of concrete-anchoring components which may comprise concrete-anchoring features for bonding the panels to the concrete. Such concrete-anchoring features may extend from the panels in the inward-outward direction (e.g. on a stem) and then, at locations spaced apart from the panels, may extend in the longitudinal and transverse directions to provide anchoring surfaces. One or more layers of concrete are poured over top of the panels. As the concrete solidifies, the concrete-anchoring components bond the lining panels to the resultant wall segment which may then be tilted from the generally horizontal table surface into a generally vertical orientation.

One particular non-limiting example of a structure lining panel for lining a concrete structure may be trimmed to have a desirable transverse dimension. In particular embodiments, the panel has two or more panel-to-panel connector components and at least one of the panel-to-panel connector components is transversely adjacent (i.e. not separated by another connector component) to a corresponding breakaway feature. The breakaway feature may comprise, for example, a score line along which the panel can be cut, or a cutting guide. By cutting along the score line, or cutting guide, the transverse length of the panel may be adjusted for a particular application. In particular embodiments, a plurality of connector components adjacent to breakaway features are spaced apart by irregular spacing transversely along a single panel. By combining multiple panels that are trimmed to have particular transverse dimensions, it may be possible to create a concrete structure of a desired length without requiring design and fabrication of custom panels.

Structure-lining apparatus according to the invention may generally be used to line any structure formed from concrete or similar curable materials. Without limiting the generality of the invention, the first part of this description presents structure-lining apparatus according to particular embodiments of the invention which are used in the fabrication of wall structures—e.g. wall-lining apparatus for tilt-up walls. Such forms may comprise so called "cast-in-place" forms, in which structures are cast in the location, or in close proximity to the location, of the place where they are intended to be used or so called "pre-cast" forms, in which structures are cast in a casting location and subsequently moved to the place where they are intended to be used. Tilt-up walls described above are one non-limiting example of structures fabricated in pre-cast forms.

In some embodiments, structure-lining apparatus according to the invention may be positioned such that the exterior surfaces of the edge-adjacent panels line at least a portion of an interior surface of a removable framework.

FIG. 1 depicts a structure lining apparatus 10 according to a particular non-limiting embodiment of the invention. In the illustrated embodiment, structure-lining apparatus 10 is a wall lining apparatus used to cover one surface of a concrete wall structure. Structure lining apparatus 10 comprises a plurality of generally planar panels 12 which extend in a longitudinal dimension (shown by double-headed arrow 14) and in a transverse dimension (shown by double-headed arrow 16). Panels 12 are disposed in edge-to-edge relationship with one another along their transverse edges 20, 22. It will be appreciated from the drawings, that transverse edges 20, 22 extend in longitudinal directions 14. The edge-to-edge configuration of panels 12 provides a structure-lining surface 26 as described in more detail below.

It should be understood that FIGS. 1 and 1A provides a general embodiment of a structure lining apparatus 10 having panels 12. Unless the context dictates otherwise, further embodiments described herein (e.g. panels 112, connector components 134, 136) may use like numbering to show that they are particular embodiments of structure lining apparatus 10. For example, panel 112 is a particular embodiment of panel 12.

Wall-lining apparatus of the illustrated embodiment also comprises a plurality of connector-type concrete-anchoring components 18. Connector-type concrete-anchoring components 18 also extend in the longitudinal direction 14 and project away from structure lining surface 26 in the general direction shown by arrow 24, in FIG. 2. Direction 24 is referred to herein as "inward-outward direction" 24. Connector-type concrete-anchoring components 18 connect transverse edges 20, 22 of adjacent panels 12 to one another and may also help to bond panels 12 to the concrete of the resultant wall as described in more detail below. For brevity, connector-type concrete-anchoring components 18 and other connector-type anchoring components described herein may occasionally be referred to in this description as "connector components" or "connectors".

In particular embodiments, panels 12 and connectors 18 are fabricated from suitable plastic as a monolithic unit using an extrusion process. By way of non-limiting example, suitable plastics include: poly-vinyl chloride (PVC), acrylonitrile butadiene styrene (ABS) or the like. In other embodiments, panels 12 and/or connectors 18 may be fabricated from other suitable materials, such as composite materials (e.g. a combination of one or more resins and natural and/or synthetic materials), for example. Although extrusion is one particular technique for fabricating panels 12 and connectors 18, other suitable fabrication techniques, such as injection molding, stamping, sheet metal fabrication techniques or the like may additionally or alternatively be used.

In some embodiments, a surface of panels 12 may be provided with a non-smooth texture (e.g. roughened and/or piled texture) or other bondable surface (not explicitly shown) to facilitate bonding of panels 12 to concrete during fabrication (e.g. as the concrete solidifies). In particular embodiments, the non-smooth texture panels 12 may have a dimension (in inward-outward direction 24) that is greater than 2.5% of the thickness of panel 12 in inward-outward direction 24. In particular embodiments, the non-smooth texture of panel 12 may have a dimension (in inward-outward direction 24) that is greater than 1% of the thickness of panel 12 in inward-outward direction 24. In other embodiments, the non-smooth texture of panel 12 may have a dimension (in inward-outward direction 24) that is greater than 0.25% of the thickness of panel 12 in inward-outward direction 24. In some embodiments, panel 12 (and/or its inner surface) may comprise a material having physical or chemical properties that bonds naturally to concrete as the concrete solidifies (e.g. acrylonitrile butadiene styrene (ABS) plastic or the like).

In particular embodiments, wall-lining apparatus 10 may comprise prefabricated panels 12 having different transverse dimensions (i.e. in the direction of double-headed arrow 16). Panels 12 may be modular in the transverse direction, such that panels 12 of various transverse sizes may be interconnected to one another using connector-type anchoring components 18. This modularity entails that connector components 18 on edges 20, 22 of panels 12 be standardized. In some embodiments, panels 12 are adjustable in transverse length, as described further below.

In some embodiments, panels 12 are prefabricated to have different longitudinal dimensions (double-headed arrow 14 of FIG. 1). In other embodiments, the longitudinal dimensions of panels 12 may be cut to length. FIG. 1 only depicts a portion of the longitudinal extension of panels 12. Panels 12 may be relatively thin in the inward-outward direction (double-headed arrow 24 in FIG. 2) in comparison to the inward-outward dimension of the resultant wall segments fabricated using wall-lining apparatus 10. In some embodiments, the ratio of the inward-outward dimension of a wall segment to the inward-outward dimension of a panel 12 is in a range of 10-600. In some embodiments, the ratio of the inward-outward dimension of a wall segment to the inward-outward dimension of a panel 12 is in a range of 20-300.

Figure 2:
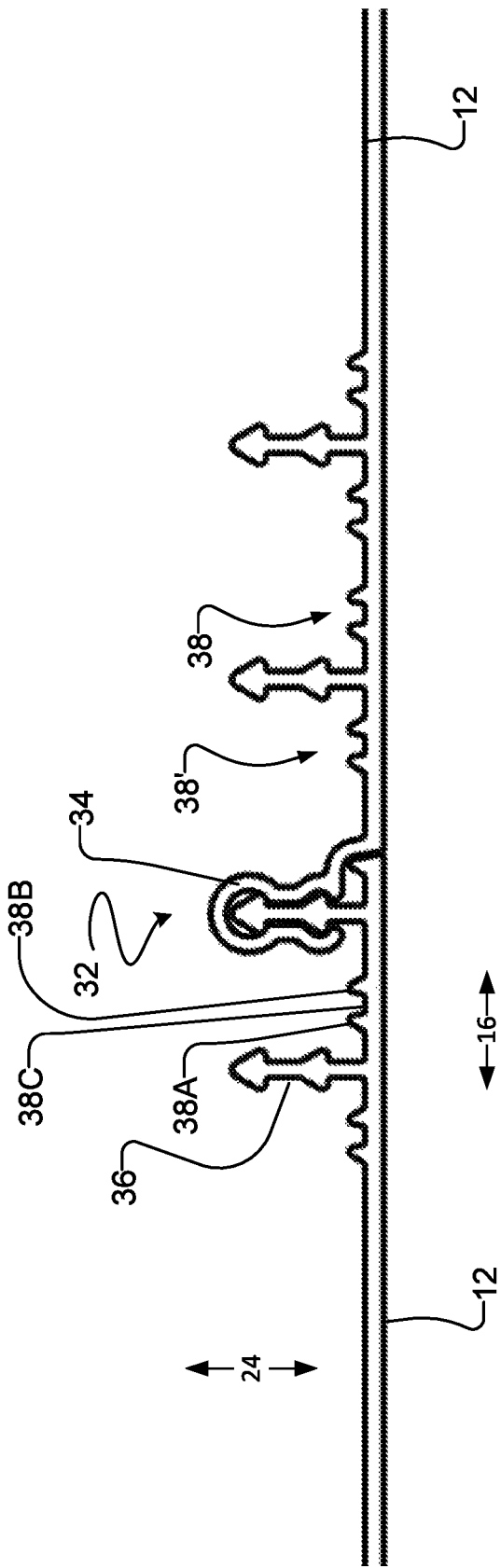
FIG. 2 is a plan view of a panel-to-panel connection according to a particular non-limiting embodiment of the invention.

FIG. 2 shows detail of an edge-to-edge connection 32 of transversely adjacent panels 12 of wall-lining apparatus 10. In particular, FIG. 2 depicts a transverse cross-section (i.e. a cross section in a plane defined by the transverse and inward-outward directions) of edge-to-edge connection 32. In the illustrated embodiment, transverse edge 22 of a first wall panel 12 comprises an L-shaped female connector 34 having an L-shaped transverse cross-section and opposing transverse edge 20 of a transversely adjacent second wall panel 12 comprises a complementary L-shaped male connector 36 having an L-shaped transverse cross-section. In the illustrated embodiment, L-shaped male connector 36 is slidably received in a corresponding L-shaped female connector 34 by moving the second wall panel 12 in the inward-outward direction 24 relative to the first wall panel 12. It will be appreciated that connector components 34, 36 represent only one set of suitable connector components which could be used to connect panels 12 in edge-adjacent relationship and that many other types of connector components could be used in place of connector components 34, 36. By way of non-limiting example, such connector components may be used to form slidable connections, deformable "snap together" connections, pivotable connections, or connections incorporating any combination of these actions.

Figure 3:
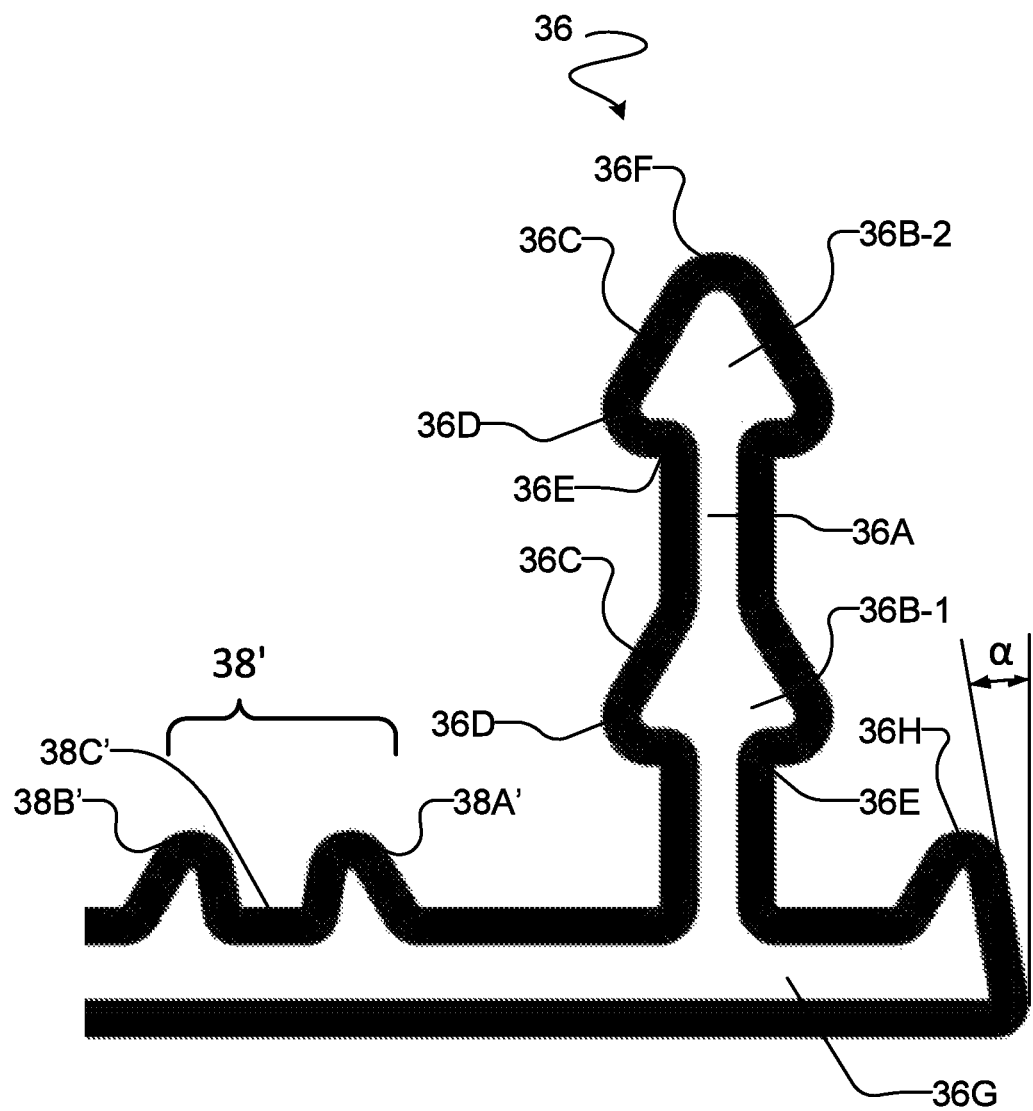
FIG. 3 is a plan view of a connector component according to a particular non-limiting embodiment of the invention.

FIG. 3 depicts a detail view of a male connector 36A according to one embodiment. Male connector 36 comprises a spine 36A protruding in the inward-outward direction 24 from panel 12. Spine 36A may extend longitudinally across panel 12. In some embodiments, spine 36A extends across the entire longitudinal dimension of panel 12 while in other embodiments spine 36A only extends across a portion of the longitudinal panel 12. In further embodiments, multiple spines 36A may be spaced apart along the longitudinal dimension of panel 12. Spine 36A may protrude substantially orthogonally to the transverse and longitudinal directions. In other embodiments, spine 36A may protrude from panel 12 at a non-orthogonal angle.

Male connector 36 may comprise one or more arrowheads 36B, each having a transverse cross-sections shaped like an arrowhead, at locations on spine 36A, spaced apart from panel 12 in the inward-outward direction 24. For example, in FIG. 2, male connector 36 comprises a first arrowhead 36B-1 on spine 36A at a first location spaced apart from panel 12 and a second arrowhead 36B-2 on spine 36A at a second location space relatively further apart from panel 12 in inward-outward direction 24.

First arrowhead 36B-1 may comprise any suitable transverse cross-sectional shape such as a circle, a triangle, a rhombus or an arrowhead as described below. In the illustrated embodiment, a transverse cross-section of arrowhead 36B-1 comprises lobes projecting transversely in opposing directions from spine 36A. The transversely projecting lobes taper in inward-outward direction 24 away from panel 12. As can be seen from FIG. 2, the tapered faces 36C of first arrowhead 36B-1 are relatively planar. This is not mandatory. Tapered faces 36C may be arcuate, stepped or the like. Tapered face 36C terminates at a corner 36D. In some embodiments, corner 36D is rounded or beveled, as illustrated. This is not mandatory, corner 36D could be a sharp corner (e.g. an acute angled corner). The intersection of corner 36D and spine 36A defines a concavity 36E. Concavity 36E may comprise a locking feature for lockingly receiving a corresponding convexity of female connector 34.

Second arrowhead 36B-2 may comprise any suitable transverse cross-sectional shape and may or may not be the same transverse cross-sectional shape as first arrowhead 36B-1. In the illustrated embodiment, arrowhead 36B-2 comprises lobes projecting transversely in opposing directions from spine 36A. The transversely projecting lobes taper in inward-outward direction 24 away from panel 12. As can be seen from FIG. 2, the tapered faces 36C of second arrowhead 36B-2 are relatively planar. This is not mandatory. Tapered faces 36C may be arcuate, stepped or the like. Tapered face 36C terminates at a corner 36D. In some embodiments, corner 36D is rounded or beveled, as illustrated. This is not mandatory, corner 36D could be a sharp corner (e.g. an acute angled corner). The intersection of corner 36D and spine 36A defines a concavity 36E. Concavity 36E may comprise a locking feature for lockingly receiving a corresponding convexity of female connector 34. Opposing tapered faces 36C of second arrowhead 36B-2 meet to define a tip 36F. Tip 36F may be rounded, as illustrated, or may be a sharp corner (e.g. an acute angled corner).

Male connector 36 comprises a leg 36G extending from the base of spine 36A in a generally transverse direction. Leg 36G may be arranged orthogonally to spine 36A. This is not mandatory. Leg 36G may be arranged at any angle relative to spine 36A. At least a portion of leg 36G may comprise part of panel 12.

Leg 36G may comprise a foot 36H. Leg 36G may terminate at foot 36H or may continue past foot 36H to define a breakaway feature, as will be discussed in more detail below. Foot 36H may protrude generally in inward-outward direction 24 from leg 36G. As illustrated in FIG. 2, foot 36H may be tapered away from panel 12. Alternatively, foot 36H may have a constant transverse dimension along the entirety or substantially the entirety of its inward-outward dimension. Angle $\alpha$ of foot 36H may be within the range of 5° to 25°. For example, in the FIG. 3 embodiment, angle $\alpha$ is 10°.

Although depicted in some embodiments as being to the right of spine 36A, leg 36G and foot 36H may also extend to the left of spine 36A. For example, FIG. 3 depicts a male connector 36 having legs 36G and feet 36H extending in both the transverse directions. This is not mandatory but may have some advantages as will be discussed further below.

Female connector 34 comprises an L-shaped receptacle comprising a first cavity 34A, a second cavity 34B and a recess 34C all defined by a wall 35. In particular, first cavity 34A is defined by a first portion 35A of wall 35, second cavity 34B is defined by a second portion 35B of wall 35 and recess 34C is defined by a recessed portion 35C of wall 35. First cavity 34A is connected to second cavity 34B by a neck cavity 34D and first portion 35A is connected to second portion 35B by a neck 35D. An opening 34E in first cavity 34A is defined by first convexities 34F of first portion 35A. Second convexities 34G are defined by the intersection of second part 35B and neck 35D.

Figure 4:
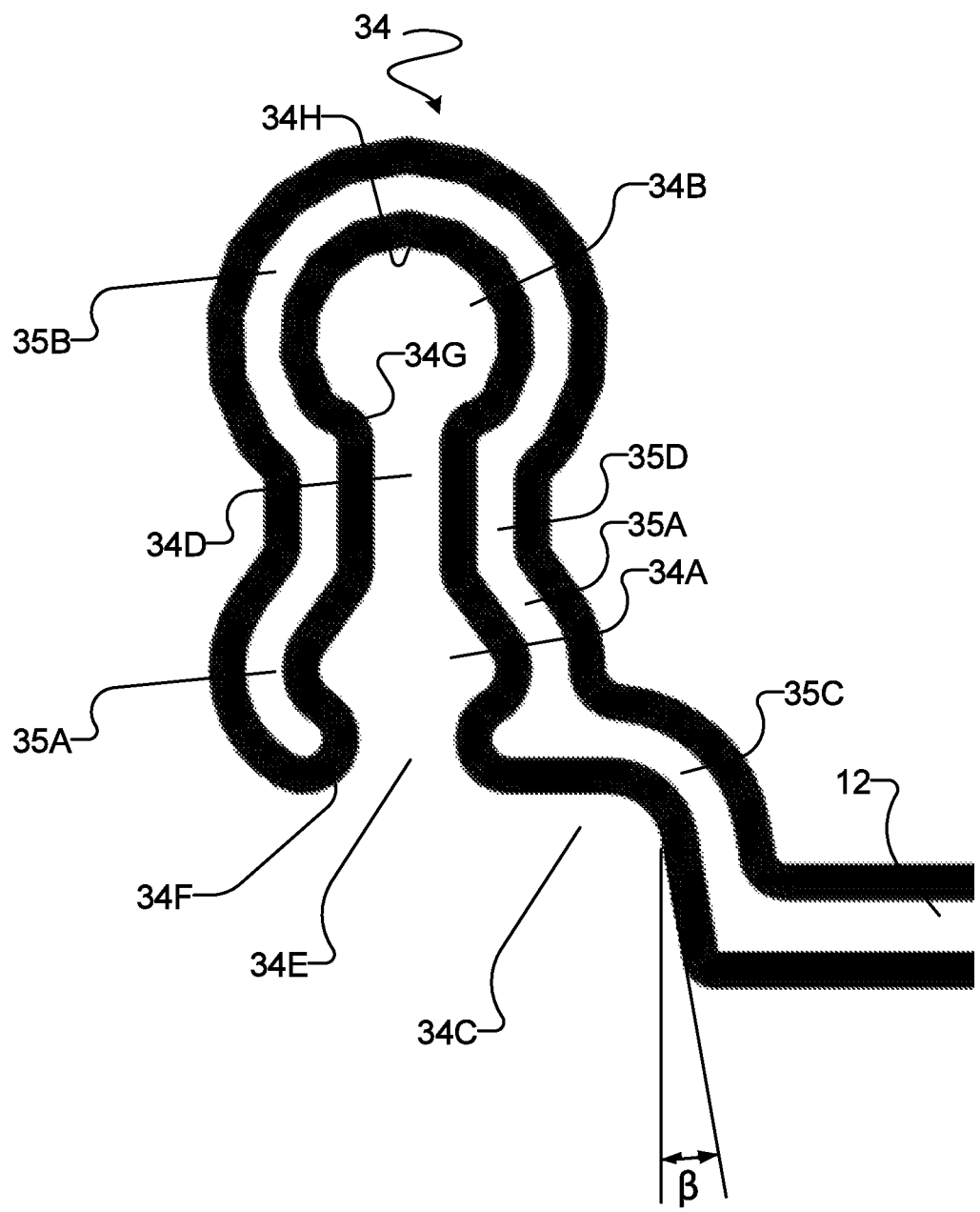
FIG. 4 is a plan view of another connector component according to a particular non-limiting embodiment of the invention.

As depicted in FIG. 4, first cavity 34A may correspond in shape to arrowhead 36B. This is not mandatory. Alternatively, first cavity 34A may comprise a different shape that is complementary to the shape of one or both of arrowheads 36B such as the circular shape of second cavity 34B. Similarly, second cavity 34B may be substantially circular in shape as depicted or may comprise a different shape that is complementary to one or both of arrowheads 36B.

Recess 34C may comprise any suitable shape to receivingly engage foot 36H. For example, recessed portion 35C of wall 35 may be beveled to engage a beveled portion of foot 36H. In some embodiments, recessed portion 35C is beveled at a complementary angle to the angle of bevel of foot 36H such that foot 36H is flush against recessed portion 35C when male member 36 is inserted in female connector 34. Recessed portion 35C of recess 34C may have an angle $\beta$ within the range of 5° to 25°. For example, in the FIG. 4 embodiment, angle $\beta$ is 10°. In other embodiments, a space may be left between foot 36H and recessed portion 35C to allow for a sealant or the like to be inserted.

Convexities 34F of first portion 35A of wall 35 define opening 34E. Opening 34E may be relatively smaller that a maximum transverse dimension of arrowheads 36B. Opening 34E may also be relatively larger than a minimum transverse dimension of arrowheads 36B, such as the transverse dimension at tip 36F, to allow tip 36F to be inserted into opening 34E. Similarly, neck cavity 34D may be relatively smaller than a maximum transverse dimension of arrowheads 36B and relatively larger than a minimum transverse dimension of arrowheads 36B, such as the transverse dimension at tip 36F, to allow tip 36F to be inserted into neck 34D.

Wall-lining apparatus 10 comprises a number of features which facilitate the bonding of wall-lining apparatus 10, and in particular structure-lining surface 26 defined by panels 12, to concrete. These features may be referred to herein as concrete-anchoring components or, more generally, anchoring components.

One concrete-anchoring component of wall-lining apparatus 10 is connector-type concrete-anchoring component 18. Connector-type concrete-anchoring components 18 are referred to as "connector-type" because they are also used to connect edge-adjacent panels 12 to one another. More particularly, in the illustrated embodiment connector-type concrete-anchoring components comprise female connector components 34 and male connector components 36 of panels 12 for connecting edge-adjacent panels 12 to one another. Each connector-type concrete-anchoring component 18 extends in inward-outward direction 24 from panels 12 into a proximate concrete layer. Each connector-type concrete-anchoring component 18 may also extend in the longitudinal direction 14 (see FIG. 1) and may comprise concrete-anchoring features. Such concrete-anchoring features may comprise bulges, leaves, protrusions or the like with extension in longitudinal direction 14 and transverse direction 16 (e.g. in a plane parallel to the plane panels 12) at one or more locations spaced apart from panels 12. When liquid concrete solidifies, connector-type concrete-anchoring components 18 are at least partially encased in the solid concrete. Through connections between connector-type concrete-anchoring components 18 and transversely adjacent panels 12, the encasement of connector-type concrete-anchoring components 18 helps to bond panels 12 and structure-lining surface 26 to proximate concrete layers.

FIGS. 5A-5G are partial top plan views of the formation of an example connection 32 between female connector 34 and male connector 36 of panels 12. To form a connection 32 therebetween, male connector 36 is forced in inward-outward direction 24 into female connector 36.

FIG. 5A shows male connector 36 and female connector 34 prior to the formation of edge-to-edge connection 32. In the illustrated embodiment, tip 36F of male connector is aligned in transverse direction 16 with opening 34E of female connector 34 in preparation for forming connection 32.

FIGS. 5B to 5G show various further stages in the process of forming connection 32 between male connector 36 and female connector 34. FIG. 5B shows male connector 36 as it begins to engage female connector 34. The narrow end of arrowhead 36B-2 (i.e. tip 36F) enters into opening 34E of first cavity 34A between first wall portions 35A. As a result, first wall portions 35A begin to resiliently deform substantially outwardly in transverse direction 16 due to the force applied by arrowhead 36B-2. This deformation results in opening 34E being widened. In the illustrated embodiment convexities 34F are shaped to complement similarly beveled surfaces 36C of arrowhead 36B-2, thereby facilitating the insertion of arrowhead 36B-2 into opening 34E of female connector 34 and the corresponding widening of opening 34E due to the deformation of first wall portions 35A.

FIG. 5C shows male connector 36 further inserted into female connector 34 such that arrowhead 36B-2 is completely inserted into first cavity 34A. To achieve this, opening 34E is widened to allow the largest transverse portion of arrowhead 36B-2 to pass by convexities 34F. After the largest transverse portion of arrowhead 36B-2 passes through opening 34E, first wall portions 35A begin to resiliently snap back around arrowhead 36B-2 into a first locked position (due to restorative deformation) once arrowhead 36B-2 passes convexities 34F. As first wall portions 35A snap back (i.e. restoratively deform), convexities 34F engage concavities 36E of second arrowhead 36B-2 to achieve the first locked position.

In the first locked position of the illustrated embodiment, the extension of convexities 34F into concavities 36E secures or locks connection 32 by providing an obstacle that hinders first wall portions 35A from being moved away from one another and releasing second arrowhead 36B-2 and hinders male connector 36 from being withdrawn from female connector 34 (e.g. in inward-outward direction 24).

FIG. 5D shows male connector 36 further inserted into female connector 34 such that arrowhead 36B-2 is beginning to enter neck cavity 34D. To achieve this, neck cavity 34D is widened to allow the largest transverse portion of arrowhead 36B-2 to pass into neck cavity 34D. As a result, neck 35D begins to resiliently deform substantially outwardly in transverse direction 16 due to the force applied by arrowhead 36B-2. This deformation results in neck cavity 34D being widened. This deformation also results in the widening of opening 34E which thereby eases the insertion of first arrowhead 36B-1 into first cavity 34A.

FIG. 5E shows male connector 36 even further inserted into female connector 34 such that arrowhead 36B-2 has passed through neck cavity 34D and has completely entered second cavity 34B. After the largest transverse portion of arrowhead 36B-2 passes through neck cavity 34D, neck portion 35D begins to resiliently snap back (i.e. restoratively deform) around arrowhead 36B-2 into a second locked position once arrowhead 36B-2 passes convexities 34G. As neck 35D snaps back, convexities 34G engage concavities 36E of second arrowhead 36B-2 to partly achieve a second locked position.

At this point, first arrowhead 36B-1 has partially passed opening 34E and neck 35D is not able to completely snap back due to the force exerted by first arrowhead 36B-1 on opening 34E. Similar to with second arrowhead 36B-2, convexities 34F are shaped to complement similarly beveled surfaces 36C of first arrowhead 36B-1, thereby facilitating the insertion of first arrowhead 36B-1 into opening 34E of female connector 34 and the corresponding widening of opening 34E due to the deformation of first wall portions 35A. As illustrated in FIG. 5D, foot 36H begins to enter recess 34C at this point.

As can be seen in FIG. 5E, second cavity 34B has a slightly larger inward-outward direction 24 dimension than does second arrowhead 36B-2. To allow first arrowhead 36B-1 to completely enter first cavity 34A, male connector 36 is inserted deeper into female connector 34 such that second arrowhead 36B-2 reaches or nearly reaches the end 34H of second cavity 34B.

While arrowheads 36B enter the first and second cavities 34A, 34B, foot 36H continues to enter recess 34C. In particular, foot 36H engages recessed portion 35C of wall 35. In some embodiments, foot 36H abuts recessed portion 35C while in other embodiments, foot 36H may be spaced apart from recessed portion 35C when second arrowhead 36B-2 is within second cavity 34B. As can be seen from FIGS. 5A-5G, leg 36G and foot 36H overlap with female connector 34 in inward outward direction 24 (i.e. a line in inward-outward direction 24 could pass through foot 36H and female connector 34). In this way, transverse edges 20, 22 of edge-adjacent panels overlap one another in the inward-outward direction. In this context, overlapping in the inward-outward direction means that a straight line can extend in the inward-outward direction and intersect both edge-adjacent panels.

FIG. 5F shows second arrowhead 36B-2 in contact with end 34H of second cavity 34B which thereby allows first arrowhead 36B-1 to pass convexities 34F and completely enter first cavity 34A. After the largest transverse portion of first arrowhead 36B-1 passes through opening 34E, first wall portions 35A are able to resiliently snap back around first arrowhead 36B-1. As second arrowhead 36B-2 remains forced into contact with end 34H of second cavity 34B, tapered surfaces 36C of first arrowhead 36B-1 engage neck 35D. In this way, first arrowhead 36B-1 may force neck 35D to widen slightly.

Meanwhile, foot 36H may be forced against recessed portion 35C, thereby causing resilient deformation of leg 36G which may flex away from spine 36A. In some embodiments, such as where sealant 46 is present between foot 36H and recessed portion 35C, sealant 46 may resiliently deform instead or as well.

As the force pushing second arrowhead 36B-2 into contact with end 34H of second cavity 34B is removed, neck 35D and leg 36G may snap back (due to the resilient deformation), thereby forcing tapered surfaces 36C out of neck cavity 34D and thereby forcing male connector 36 into a second locked position, as illustrated in FIG. 5G. As first wall portions 35A snap back, convexities 34F engage concavities 36E of first arrowhead 36B-1 to achieve a second locked position.

In the second locked position of the illustrated embodiment, convexities 34G, 34F engage concavities 36E. The extension of convexities 34F, 34G into concavities 36E secures or locks connection 32 by providing multiple obstacles that hinder first wall portions 35A, neck 35D and second wall portions 35B from being moved away from one another and releasing arrowheads 36 and thereby hinder male connector 36 from being withdrawn from female connector 34 (e.g. in inward-outward direction 24). The second locked configuration is supplemented by restorative deformation forces applied to tapered surfaces 36C of first arrowhead 36B-1 by neck 35D.

In some embodiments, an elastic or viscoelastic (e.g. flexible) seal may be inserted between foot 36H and recessed portion 35C to help seal connection 32 and prevent or minimize the leakage of fluids (e.g. liquids or gasses) through connection 32. In some embodiments, the seal may be provided by a curable material (e.g. silicone, caulking, glue, a curable elastomer, a curable polyolefin and/or the like) which may be inserted between foot 36H and recessed portion 35C and may then be permitted to cure in recess 34C. Such a curable seal may bond (e.g. an adhesive bond, a bond involving a chemical reaction, a bond involving melting and re-solidifying a portion of panels 12 and/or the like) to one or more of the surfaces that define recess 34C such as foot 36H or recessed portion 35C. In some embodiments, the seal may be fabricated from a material that itself bonds to the surfaces of panels 12. In some embodiments, it may be desirable to interpose a primer, a bonding adhesive and/or the like between the seal and the surface(s) which define recess 34C to make and/or to enhance the bond therebetween.

It is not necessary that the seal be provided by a curable material. In some embodiments, the seal may be provided by a suitably shaped solid flexible seal. Such a solid flexible seal may comprise elastomeric material, polyolefin material or any other suitable material. In some embodiments, such a solid seal may be bonded (e.g. an adhesive bond, a bond involving a chemical reaction, a bond involving melting and re-solidifying a portion of panels 12 and/or the like) to one or more of the surfaces of recess 34C.

Figure 9:
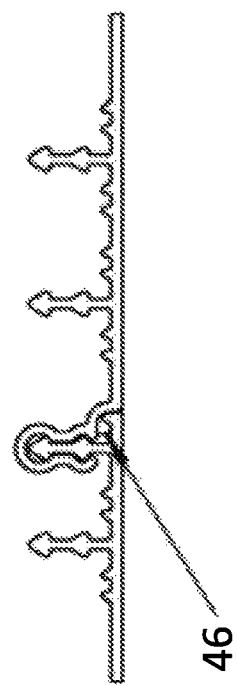
FIG. 9 is a plan view of a panel-to-panel connection having sealant according to a particular non-limiting embodiment of the invention.

In some embodiments, a sealing material may be provided on some surfaces of connector components 34, 36. Such sealing material may be relatively soft (e.g. elastomeric) when compared to the material from which the remainder of panel 12 is formed. Such sealing materials may be provided using a co-extrusion process or coated onto connector components 34, 36 after fabrication of panels 12, for example, and may help to make connection 32 impermeable to liquids or gasses. Suitable surface textures may also be applied to connector components 34, 36 to enhance the seal or friction between components 34, 36. FIG. 9 depicts a non-limiting example embodiment of a connection 32 comprising a sealing material 46 disposed within recess 34C between foot 36H and recessed portion 35C. Sealing material 46 may be co-extruded with panel 12 and may improve the seal between male connector 36 and female connector 34. In other embodiments, sealing material 46 may be additionally or alternatively be located on the outside edge of foot 36H or may wrap around foot 36H.

In some embodiments, the transverse dimension of panels 12 may be adjustable. In particular, panels 12 may include one or more breakaway features 38 to allow for shortening the transverse length of panel 12. For example, panels 12 of the FIG. 2 embodiment comprise breakaway features 38 transversely adjacent to male connectors 36. In this way, if panel 12 is broken at breakaway feature 38, a male connector 36 will still be at new transverse edge 20.

Breakaway features 38 may comprise any suitable structure for facilitating the cutting or breaking of panels 12 at a desired transverse location. For example, breakaway features 38 may comprise a scored line, a cutting guide, some combination thereof or the like.

In particular embodiments, breakaway feature 38 may comprise a pair of guides 38A, 38B. In some embodiments, such as is depicted in FIG. 2, first guide 38A may comprise foot 36H of male connector 36. First and second guides 38A, 38B may each comprise a protrusion (protruding in inward-outward direction 24 from panel 12) extending substantially longitudinally across panel 12. Guides 38A, 38B may define a cut-line or cutting path 38C therebetween. Cut-line 38C may comprise a notional longitudinally extending line between first guide 38A and second guide 38B. Together, guides 38A, 38B may function to aid in allowing panel 12 to be cleanly cut along cut-line 38C. In some embodiments, cut line 38C is scored.

In some embodiments, a transverse dimension of first and second guides 38A, 38B tapers in inward-outward direction 24 away from panel 12 (e.g. a transverse dimension of first guide 38A closer to the inner surface of panel 12 is larger than a transverse dimension of first guide 38A further from the inner surface of panel 12), similar to feet 36H, described above. Second guide 38B may be a mirrored version of first guide 38A (mirrored about a plane orthogonal to panel 12).

Figure 6:
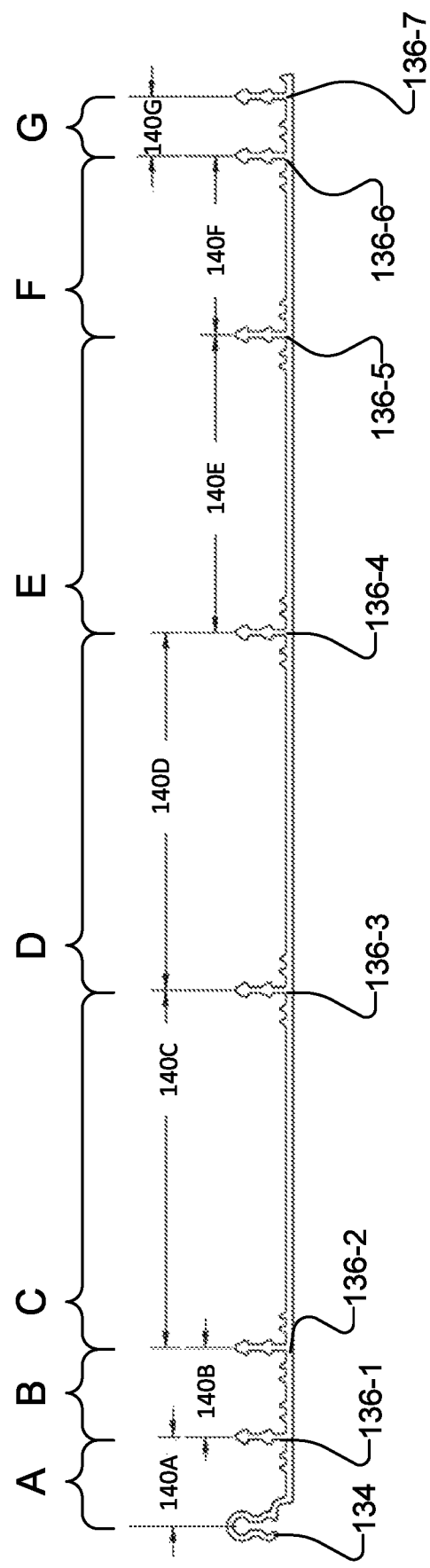
FIG. 6 is a plan view of a panel according to a particular non-limiting embodiment of the invention.
Figure 6A:
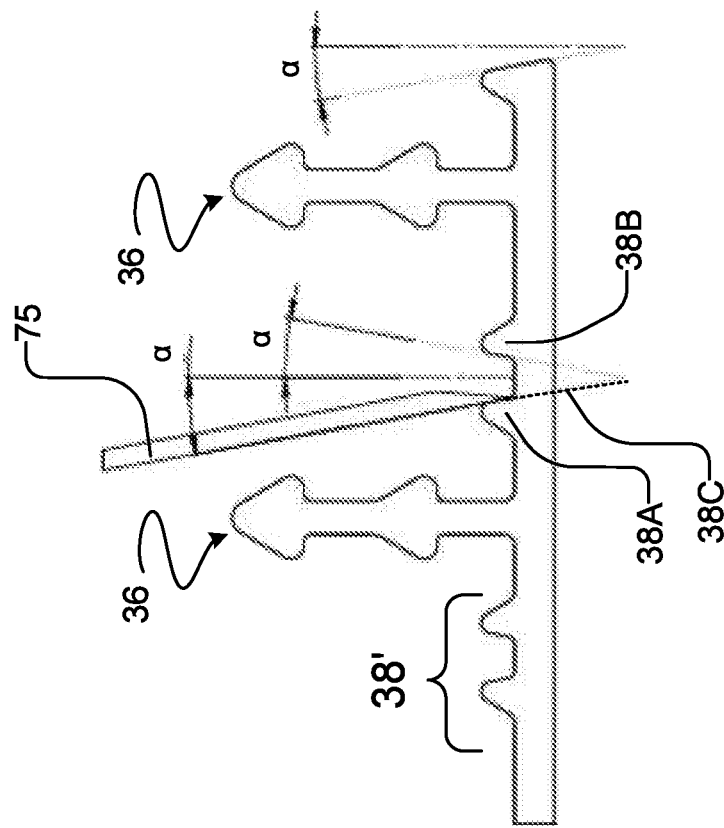
FIG. 6A is a plan view of a portion of a panel and a sharp edge in position to trim the panel according to a particular non-limiting embodiment of the invention.

In practice, a sharp edge 75, such as a knife, the claw of a hammer, a pick, a screwdriver or the like, may be drawn along cut-line 38C, guided by first guide 38A and/or second guide 38B (i.e. to ensure that the sharp edge is maintained on cut-line 38C) to thereby cut or breakaway panel 12 along cut-line 38C, as illustrated in FIG. 6A. In some embodiments, sharp edge 75 is merely used to score (i.e. partially cut through panel 12) and panel 12 is subsequently flexed or bent so as to break along the scored cut-line 38C. In other embodiments, cut-line 38C is scored as part of the manufacturing process of panel 12. Cut-line 38C may be oriented at angle α such that the newly created foot 36H is complementary to recess portion 35C as described above.

In other embodiments, a specialized cutting tool having complementary guides or tracks for receiving first guide 38A and 38B may be employed to ensure that cutting of panel 12 is clean, accurate and conforms with a desired geometry (i.e. the edge is cut at a specified angle such as, for example, to mimic angle α of foot 36H). In some embodiments, the specialized cutting tool has complementary guides for receiving another feature of panel 12, such as male connector 36. For example, FIGS. 6B-6D depict a cutting tool 80 according to a particular non-limiting embodiment of the invention.

Cutting tool 80 comprises a body 80A and a blade 75. Blade 75 may be at least partly contained within a slot 80C in body 80A and may optionally protrude from slot 80C of body 80A. Blade 75 may extend primarily in the longitudinal and inward-outward directions and may be relatively narrow in the transverse direction). Blade 75 may be fixed to body 80A by one or more attachment screws 80F which may pass transversely through an aperture in blade 75 (not pictured). To prevent blade 75 from rotating (in a plane defined by the inward-outward and longitudinal directions) about attachments screw 80F, blade 75 may be held in place by one or more set screws. For example, set screw 80D may be employed to set the depth in the inward-outward direction at which blade 75 protrudes from body 80A and set screw 80E may be employed to prevent rotation of blade 75 about attachment screw 80F. Set screw 80E may also prevent side-to-side movement of blade 75 in the transverse direction within slot 80C. During transportation, set screw 80E may be loosened and set screw 80D may be retracted to allow blade 75 to be retracted completely into slot 80C. Blade 75 may then be locked in the retracted position by re-tightening set screw 80E. In this way, it is safe to transport tool 80.

Body 80A also defines a longitudinally extending channel 80B that may be shaped to complement one or more elements of panels 12 for slidably attaching tool 80 to panel 12. For example, FIG. 6D depicts one embodiment in which channel 80B is shaped to slidingly receive a longitudinally extending member of panel 12 such as male connector 36 of panel 12. Channel 80B may be slightly larger in the inward-outward and transverse dimensions than male connector 36 to permit relative movement between tool 80 and panel 12 when tool 80 is engaged on male connector 36. Channel 80B may also be sufficiently tight to ensure that blade 75 travels along a pre-defined trajectory without departing substantially from the pre-defined trajectory because of an overly loose fit of channel 80B.

By engaging channel 80B of tool 80 on male connector 36 of panel 12 and sliding tool 80 along the longitudinal dimension of panel 12, it may be possible to cut or score panel 12 using blade 75. The depth of blade 75 (i.e. the length of protrusion of blade 75 from body 80A in the inward-outward direction) is greater than the difference between a total inward-outward dimension of the longitudinally extending member of panel 12 (e.g. male connector 36) and an inward-outward depth of protrusion of the longitudinally extending member of panel 12 into channel 80B. If the depth of blade 75 is set to extend further than the thickness of panel 12, panel 12 may be cut through as tool 80 is slid longitudinally along male connector 36. Alternatively, if the depth of blade 75 is set to extend only part way through the thickness of panel 12, panel 12 will only be scored (i.e. panel 12 will not be cut through). After being scored, panel 12 can be bent along the score line until it breaks along the score line.

As can be seen in FIG. 6D, when tool 80 engages male connector 36, blade 75 is lined up between guides 38A, 38B such that blade 75 will cut panel 12 along cut line 38C. When tool 80 is engaged with panel 12, blade 75 may be orthogonal to panel 12 or may be oriented at a non-orthogonal angle (e.g. angle α) such that the newly created foot 36H is complementary to recess portion 35C as described above.

In some embodiments, tool 80 is handheld and is slid along an element of panel 12 (e.g. male connector 36) manually. In other embodiments, tool 80 is attached to a motor, winch, or another machine providing mechanical advantage to aid in sliding tool 80 along panel 12 and cutting or scoring panel 12.

FIG. 1 shows an embodiment of panels 12 in which each panel 12 comprises a plurality of transversely spaced apart male connectors 36 with corresponding adjacent breakaway features 38. For example, FIG. 1 depicts a panel 12 having seven male connectors 36 and six breakaway features 38. This is not mandatory, panel 12 may comprise as few as one male connector 36 or may comprise a plurality of male connectors 36, as desired.

Each breakaway feature 38 along the transverse length of panel 12 allows for the panel to be shortened to a particular length. For each additional breakaway feature on panel 12, panel 12 is capable of being shortened to another transverse length. In some embodiments, breakaway features 38 (and their corresponding male connectors 36) are spaced apart evenly along the transverse length of panels 12. This may allow for an easy determination of the length of a panel 12 or a series of panels 12 attached to one another. However, by spacing breakaway connectors 38 equally, the possible transverse length variations of one or more panels 12 is limited to multiples of that spacing.

In the illustrated embodiments, at least some male connectors 36 (with their corresponding adjacent breakaway features 38) are transversely spaced apart at irregular distances along panel 12. In this way, greater variations in the length of panels 12 can be achieved by combining panels 12 of different lengths.

FIG. 6 depicts an exemplary panel 112 having seven male connectors 136-1, 136-2, 136-3, 136-4, 136-5, 136-6 and 136-7 (collectively referred to as male connectors 136) and a single female connector 134. First male connector 136-1 is spaced apart from female connector 134 by a transverse distance 140A (measured from the center-to-center of adjacent spines 36A), second male connector 136-2 is spaced apart from first male connector 136-1 by a transverse distance 140B, third male connector 136-3 is spaced apart from second male connector 136-2 by a transverse distance 140C, fourth male connector 136-4 is spaced apart from third male connector 136-3 by a transverse distance 140D, fifth male connector 136-5 is spaced apart from fourth male connector 136-4 by a transverse distance 140E, sixth male connector 136-6 is spaced apart from fifth male connector 136-5 by a transverse distance 140F and seventh male connector 136-7 is spaced apart from sixth male connector 136-6 by a transverse distance 140G.

As can be seen from FIG. 6, transverse distance or transverse spacing 140A may be equal to transverse distance 140B and transverse distance 140C may be equal to transverse distance 140D. This is not mandatory. For example, panel 112 may comprise a number of male connectors 136 each spaced apart by an equal transverse distance or a number of male connector 136s, each spaced apart by a different transverse distance. In further embodiments still, two or more male connectors 136 are spaced apart by different transverse distances and two or more male connectors 36 are spaced apart by the same transverse distance.

In some embodiments, one or more transverse distances 140 may comprise a non-whole unit of distance (e.g. one or more transverse distances may comprise, for example, a fraction of an inch such as 0.25 inches or a fraction of a centimeter such as 1.5 cm). In this way, panels 12 can be combined to create transverse lengths of exact desired lengths, even if the length is not equal to a whole unit of measurement.

As can be seen from FIG. 6, and other Figures herein, breakaway features 38 may be located on opposing transverse sides of spines 36A of male connectors 36 (e.g. on the left and right of spines 36A of male connectors 36 in FIG. 6). For convenience, breakaway features 38 located on a first side of an adjacent spine 36A (i.e. the right side as depicted) will be referred to as breakaway features 38 and breakaway features located on a second side of an adjacent spine 36A (i.e. the left side as depicted) will be referred to as breakaway features 38'. Like breakaway features 38, breakaway features 38' comprise a first guide 38A', a second guide 38B' and a cut line 38C' defined therebetween. Providing breakaway features on either side of spines 36A allows for panels 12 to be trimmed on either side of spines 36A. However, by trimming panel 12 at a breakaway feature 38', located between a female connector 34 and a male connector 36, the trimmed panel 12' will lack a female connector 34 and will therefore not be attachable to multiple additional panels 12 each comprising a single female connector 34 without adding or replacing female connector 34 in some way, such as with a double female connector 42.

Figure 7:
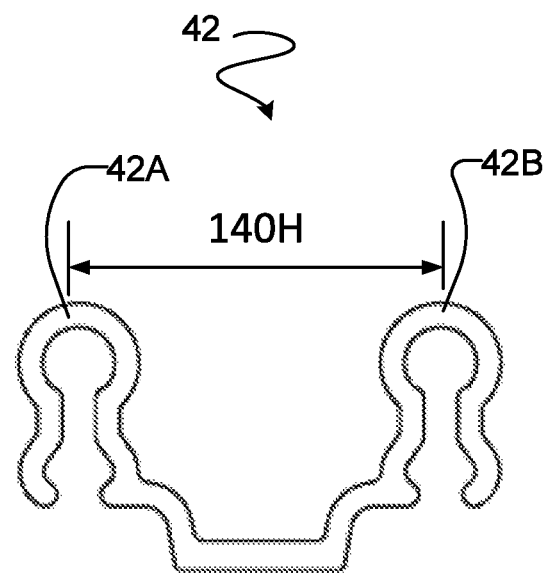
FIG. 7 is a plan view of a double female connector according to a particular non-limiting embodiment of the invention.

FIG. 7 depicts an exemplary double female connector 42 comprising two opposing female connectors 42A, 42B. Each of opposing female connectors 42A, 42B may be similar or identical to female connectors 34 described herein except that one of female connectors 42A, 42B may be a mirror reflection of female connector 34 about a plane extending in inward-outward direction 24 and longitudinal direction 16. Double female connector 42 may be employed to connect transverse edge 20 of a panel 12 via female connector 42A to a panel 12 that has been trimmed to remove female connector 34, as described above, via female connector 42B. Female connector 42A is spaced apart from female connector 42B by a transverse distance 140H (measured from the center of female connector 42A to the center of female connector 42B). Transverse distance 140H may be chosen as desired.

Figure 8:
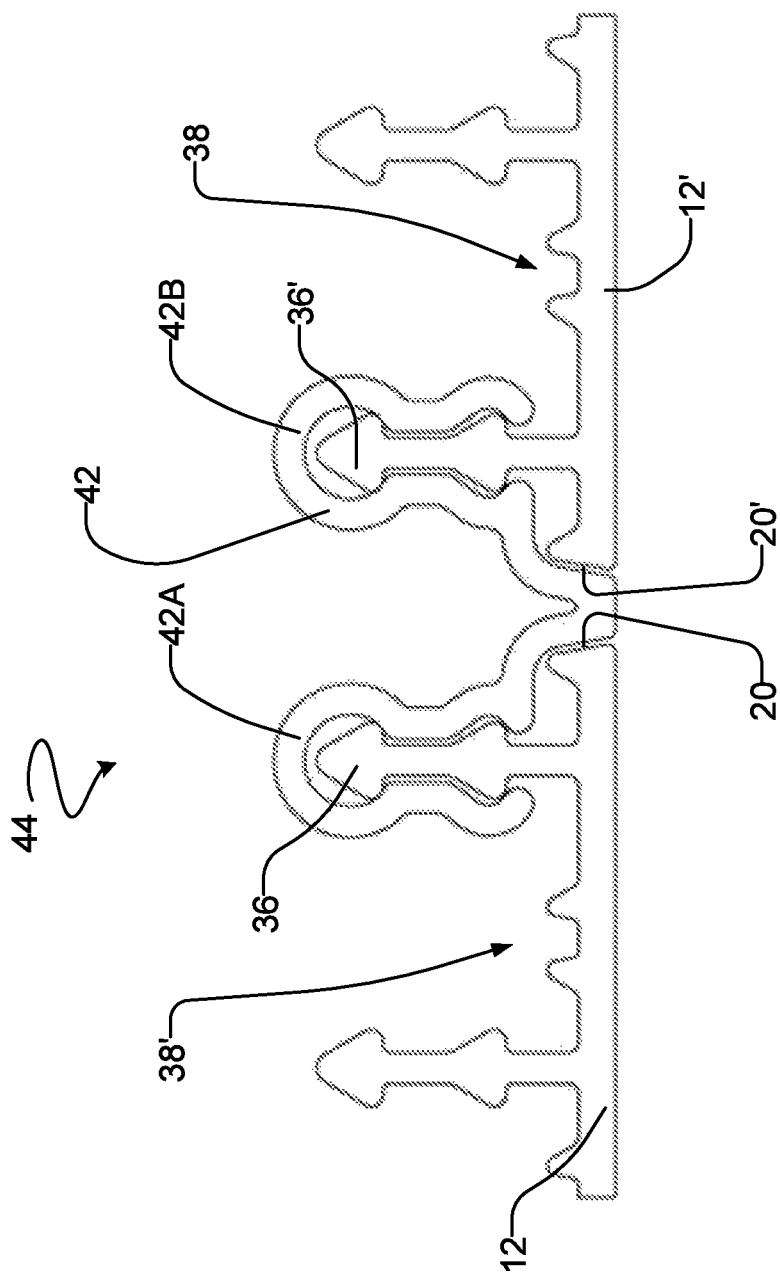
FIG. 8 is a plan view of a panel-to-panel connection using a double female connector according to a particular non-limiting embodiment of the invention.

FIG. 8 depicts an exemplary connection 44 comprising panel 12 connected to panel 12' (e.g. a panel 12 having been trimmed to remove female connector 34) by way of double female connector 42. In this way, transverse edge 20 of panel 12 is attached in an edge-to-edge relationship with transverse edge 20' of panel 12'. Male connector 36 of panel 12 is inserted into female connector 42A and male connector 36' (i.e. a mirror image of male connector 36) is inserted into female connector 42B (a mirror image of female connectors 42A, 34) in a similar way as described above in relation to male connector 36 and female connector 34.

By employing double female connector 42, a combination of panels 12, 12' may be created to allow for a greater variety of desired lengths of panels, since panels 12 can be trimmed from both transverse ends to achieve a desired length.

For purposes of illustration, the dimensions (in generic units of length such as cm, inches, feet, m, etc.) of a particular non-limiting example embodiment of panel 112 and double female connector 42 is set out in Table 1.

TABLE 1

Spacing of male connectors 136 on panel 112 and female connectors 42A, 42B on double female connector 42

| Section | Spacing | Length of spacing (generic units of length) |
|---|---|---|
| A | Transverse distance 140A | 0.75 |
| B | Transverse distance 140B | 0.75 |
| C | Transverse distance 140C | 3.0 |
| D | Transverse distance 140D | 3.0 |
| E | Transverse distance 140E | 2.5 |
| F | Transverse distance 140F | 1.5 |
| G | Transverse distance 140G | 0.5 |
| H | Transverse distance 140H | 0.5 |

According to the Table 1 embodiment, a single panel 112 comprises 12.0 units of length. By trimming panel 112 and employing double female connector 42 when necessary, it is possible to create panels 12 of lengths between 1.5 units and 12.0 units in 0.5 unit increments as set out in Table 2, below. It may also be possible to obtain many lengths between 0.75 units and 12 units in 0.25 unit increments but, for simplicity, these are not set out below.

TABLE 2

Exemplary combinations of sections for achieving desired lengths between 1.5 and 12.0 units

| Panel Length (units of length) | Necessary Sections |
|---|---|
| 1.5 | A, B |
| 2.0 | H, F |
| 2.5 | H, G |
| 3.0 | H, E |
| 3.5 | H, C |
| 4.0 | A, B, H, F, G |
| 4.5 | A, B, C |
| 5.0 | A, B, H, C |
| 5.5 | A, B, C, H, G |
| 6.0 | H, D, E |
| 6.5 | H, C, D |
| 7.0 | A, B, C, H, F, G |
| 7.5 | A, B, C, D |
| 8.0 | H, D, E, F, G |
| 8.5 | A, B, C, D, H, G |
| 9.0 | H, C, D, E |
| 9.5 | H, C, D, H, E |
| 10.0 | A, B, C, D, E |
| 10.5 | H, C, D, E, F |
| 11.0 | A, B, C, D, E, H, G |
| 11.5 | A, B, C, D, E, F |
| 12.0 | A, B, C, D, E, F, G |

For example, if a section of panels 12 of 9.5 units is desired, a first panel 112 would be trimmed at breakaway feature 138' adjacent to male connector 136-2 of section C and at breakaway connector 138 adjacent to male connector 136-4 of section D. An additional panel 112 would be trimmed at breakaway feature 138' adjacent male connector 136-4 of section E and at breakaway feature 138 adjacent male connector 136-5 of section E. A second female connector 42B of a first double female connector 42 would then be attached to male connector 136-2 of section C, and a second double female connector 42 connected to male connector 136-4 of section D. Finally, male connector 136-4 of section E would be connected to first female connector 42A of the second double female connector 42. The final product would be a chain of pieces equal in length to 9.5 units and having a female connector 42A at one transverse edge and a male connector 136-5 at the opposite transverse edge.

It should be understood by those skilled in the art that multiple panels 112 having the Table 1 dimensions and multiple double female connectors 42 could be combined to achieve panel 12 combinations having any suitable length of almost any length greater than 0.75 units, in 0.25 unit increments (except for 1.75 units). It should also understood that similar results could be achieved using panels 112 having different dimensions than the Table 1 dimensions to result in smaller, bigger or different incremental size increases. For example, section F could have a transverse dimension 140F of 1.0 unit instead of 1.5 units.

In some embodiments, more than just a straight section of wall may be desired. For example, it may be desirable to provide a wall structure (e.g. a tilt-up wall structure) having one or more corners. FIG. 10 depicts a corner piece 348 connectable to panels 12 to create a wall structure having one or more corners.

Corner piece 348 extends in a longitudinal dimension (i.e. into and out of the page in FIG. 10), in the transverse dimension (shown by double-headed arrow 16) and in an inward-outward dimension (shown by double-headed arrow 24). Corner pieces 348 and/or panels 12 are disposed in edge-to-edge relationship with one another along their edges. The edge-to-edge configuration of panels 12 and corner pieces 348 provide a structure-lining surface 26 having one or more corners.

Corner piece 348 comprises a first planar section 348-1 extending from a female connector 334. A second planar section 348-2 extends from first planar section 348-1 at 45° thereto. Second planar section 348-2 comprises a male connector 336-1 and a breakaway feature 338'. Male connector 336-1 is disposed at 45° relative to female connector 334. In this way, if corner piece 348 is trimmed at breakaway feature 338 adjacent male connector 336-1, a first panel 12 can be attached to corner piece 348 at connector 334 while a second panel 12 can be attached to corner piece 348 at male connector 336-1 to create a single structure-lining surface 26 having a 45° corner.

Corner piece 348 also comprises a third planar section 348-3 extending at 45° from second planar section 348-2. Third planar section 348-3 comprises a second male connector component 336-2 and a second breakaway feature 338 adjacent to male connector 336-2. In this way, a first panel 12 can be attached to corner piece 348 at connector 334 while a second panel 12 can be attached to corner piece 348 at male connector 336-2 to create a single structure-lining surface having a 90° corner.

Multiple corner pieces 348 may be combined to achieve a corner having an inner angle of less than 90° or to make a complex shape having multiple proximate corners.

It should be understood from the disclosure herein that portions 348-1, 348-2, 348-3 may be disposed from one another at angles different from 45°. For example, in another embodiment, a corner piece 348 may comprise five portions each disposed at 22.5° to adjacent portions. As a further example, a corner piece 348 may not have a total angle of 90° and could comprise four portions, each angled at 20° from adjacent portions to create a corner piece having a total angle of 60°. In some embodiments, for each additional portion, an additional corresponding male connector 336 may be added. Some embodiments may comprise only one male connector 336 while others comprise more than two male connectors 336.

FIG. 11 depicts an exemplary structure lining apparatus 410. In some embodiments, structure lining apparatus 410 may comprise multiple different sections. For example, FIG. 11 depicts a first plurality of panels 412 forming a first lined structure 410-1 and a second plurality of panels 412 forming a second lined structure 410-2. It may be too cumbersome to construct the first and second lined structures 410-1, 410-2 as a single structure (e.g. a single structure would be too heavy to lift into place or too large to form as one piece). Once the first and second structures 410-1, 410-2 are cast or raised into place, it may be desirable to attach the first lined structure 410-1 to the second lined structure 410-2. First and second lined structures may be attached, for example, for structural or strengthening purposes, sealing purposes or for cosmetic purposes.

A joint plug 450 and/or a joint cover 452 may be employed to assist in attaching lined structures 410-1, 410-2. For example, a curable material such as caulking, epoxy, polymer, elastomer, concrete, etc. may be poured into a space 454 between lined structures 410-1, 410-2 after lined structures 410-1, 410-2 are in place. As the curable material cures, a joint plug 450 may be inserted at least partially into space 454. Alternatively, joint plug 450 may be used to ensure that the curable material does not leak from space 454. Joint plug 450 may be temporarily supported from outside space 454 while the curable material cures. Joint plug 450 may have a longitudinal dimension approximately equal to the longitudinal dimension of panels 12 to provide sufficient coverage to stop the curable material from leaking.

As depicted in FIG. 11, joint plug 450 may comprise a female connector 450A. Female connector 450A may be substantially similar to female connectors 34 except that it has symmetrical recesses similar to recess 34C. Female connector 450A may be capable of lockingly receiving male components 36, as described above. As female connector 450A protrudes into space 454, the curable material eventually hardens around it and thereby holds joint plug 450 in place.

A joint cover 452 may be employed, for example, to improve a seal between lined structures 410-1, 410-2 or for cosmetic reasons. Joint cover 452 may comprise a male connector 452A, substantially similar to at least a portion of male connector 36, for insertion into female connector 450A of joint plug 450. Joint cover 452 may comprise a cover surface 452B that is substantially smooth. Cover surface 452B may be arcuate to provide space underneath joint cover 452 to fit joint plug 450 while minimizing protrusion in inward-outward direction 24. Joint cover 452 may comprise one or more inwardly facing protrusions 452C to improve the seal between joint cover 452 and lined structures 410-1, 410-2 and/or provide structural rigidity to joint cover 452. As male connector 452A of joint cover 452 is inserted in to joint plug 450, protrusions 450C may be resiliently deformed against structures 410-1, 410-2 and/or joint plug 450. In some embodiments, joint cover 452 may be employed without joint plug 450 (e.g. male connector 452A is caused to protrude into space 454 to be held in place by the curable material).

FIGS. 12A and 12B depict a joint cover 552 according to another embodiment. Joint cover 552, like joint cover 452, comprises a male connector 552A, a cover surface 552B and one or more protrusions 552C. However, joint cover 552 differs from joint cover 452 in that male connector 552A is not located transversely centrally on joint cover 552. Instead, male connector 552A is offset to better accommodate connecting to female connector 34 directly, without using a joint plug 450, as depicted in FIG. 12B.

FIG. 13 depicts another non-limiting example of a joint cover 652. Joint cover 652 is substantially similar to joint cover 452 except that joint cover 652 comprises a female connector 652A instead of male connector 452A. As can be seen from FIG. 13, a pair of joint covers 652 may be employed in conjunction with a joint cover connector 654. Joint cover connector 654 extends in the longitudinal direction and the inward-outward direction 24 between a pair of lined structures 610. Joint cover connector 654 may comprise a plurality of protrusions 654A similar to the protrusions 36B of male connectors 36 described herein. Female connector 652A may be connected to joint cover connector 654 by engaging female connector 652A with protrusions 654A in a similar to fashion to the way that male connector 36 is connected to female connector 34. Due to the provision of a plurality of protrusions 654A, an inward-outward dimension of joint cover connector 654 may be adjusted by cutting joint cover connector 654 without limiting the ability of joint cover connector 654 to connect to joint covers 652. In this way, a single joint cover connector 654 may be employed for structures 610 of various inward-outward direction dimensions without having to custom design a new joint cover connector 654 each time. In some embodiments, joint cover connector 654 may be employed to replace a joint plug 450.

Figure 14:
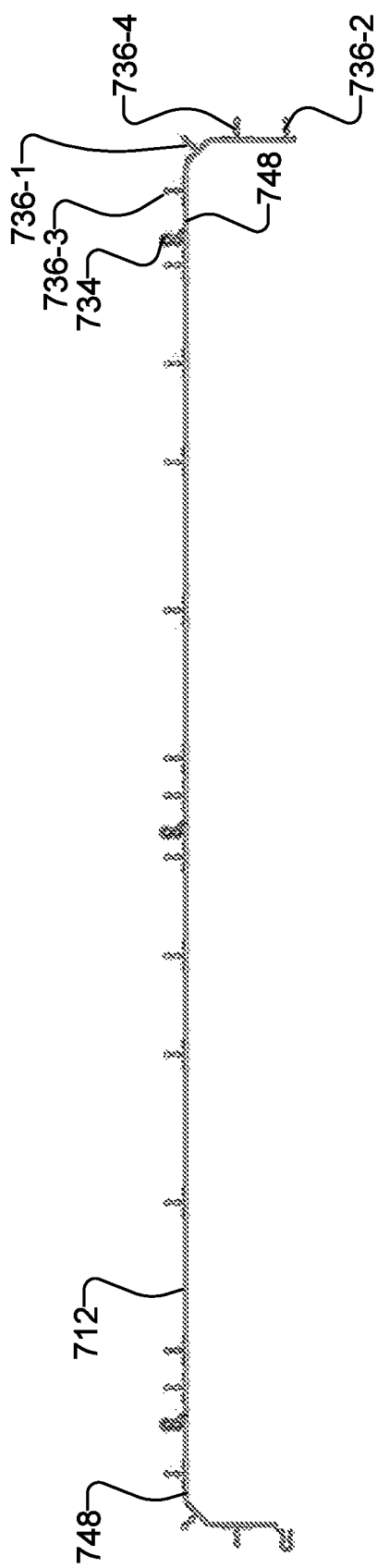
FIG. 14 is a plan view of a structure lining apparatus according to a particular non-limiting embodiment of the invention.

In some embodiments, panels 12 may also be employed as a stay-in-place formwork (i.e. panels 12 may comprise one half of a stay-in-place formwork and may face additional panels 12, which form a second half of a stay-in-place formwork and a curable material is poured and allowed to cure between the facing panels 12). FIG. 14 depicts a non-limiting exemplary embodiment of panels 12 attached to outside corner pieces 748. Outside corner pieces 748 are substantially similar to corner pieces 348 in that they comprise a first portion 748-1 having a female connector 734, a second portion 748-2 having a first male connector 736-1 and a third portion 748-3 having a second male connector 736-2. However, inside corner piece 748 differs from corner piece 348 in that the connector components (e.g. female connector 734 and male connectors 736-1, 736-2) are on the opposite (i.e. outside) surface as compared to the connector components (e.g. female connector 334 and male connectors 336-1, 336-2) of corner piece 348. In this way, outside corner piece 748 can line surfaces having concave corners. Inside corner piece 748 also differs in that first portion 748-1 comprises a third male connector 734-3 and third portion 748-3 comprises a fourth male connector 734-4.

In some embodiments, panels 12 may be employed as a stay-in place formwork for a curved structure. Where the structure is curved, panels 12 may be curved to match the curvature of the structure. Additionally or alternatively, panels 12 may be deformable such that they can be deformed to match the curvature of the structure.

Figure 15:
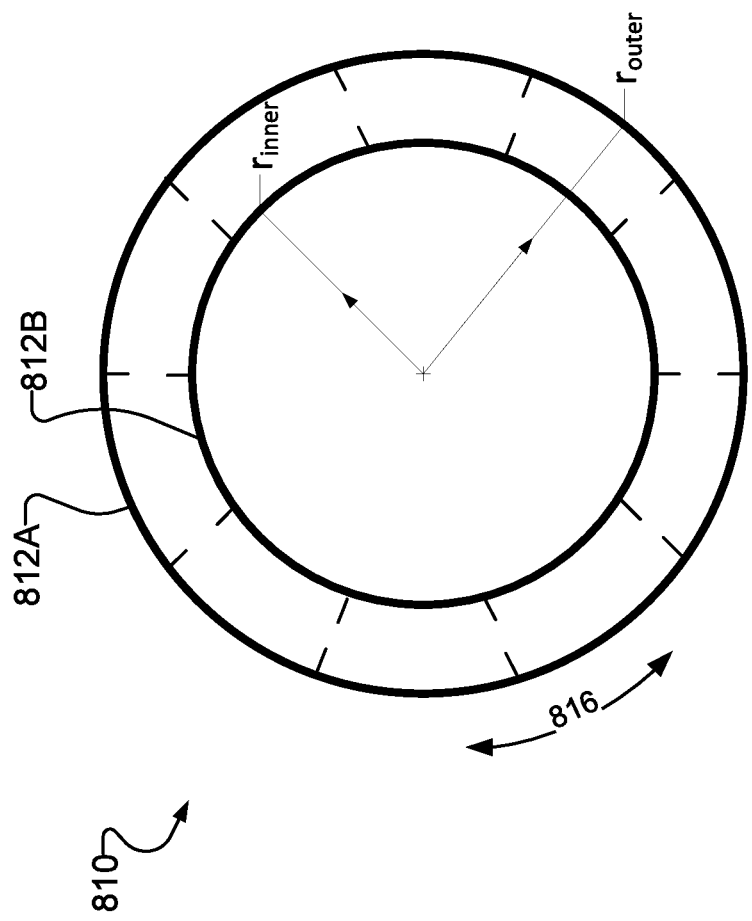
FIG. 15 is a plan view of a stay-in-place formwork according to a particular non-limiting embodiment of the invention.

FIG. 15 depicts a structure 810 comprising outer panels 812A and inner panels 812B (collectively referred to as panels 812). Inner and outer panels 812A, 812B may comprise any suitable panels 12 (or 112, 212 etc.) described herein that are deformed to have a curved surface. As can be seen from FIG. 15, outer panels 812A are connected together in edge-to-edge relationships to have a radius, $r_{outer}$ and inner panels 812B are connected together in edge-to-edge relationships to have a radius, $r_{inner}$. Radius, $r_{outer}$ is larger than radius, $r_{inner}$. In some embodiments, individual outer panels 812A may each be, on average, longer in transverse direction 816 than individual inner panels 812B. Alternatively or additionally, a greater number of panels 812A may be used than panels 812B. The difference in the length Δ in the transverse direction 816 between the total of panels 812A and the total of panels 812B may be determined by:

$$\Delta = 2\pi(r_{outer} - r_{inner})$$

In some embodiments, each panel 812 comprises multiple sections (e.g. like sections A, B, C etc. in FIG. 6 and as discussed above) separated by male connectors 136 and corresponding breakaway components 38 (such as depicted in FIG. 6). As described in more detail above, individual sections may be of various transverse lengths. In particular, one or more sections of panel 812 may comprise a section having a transverse length equal to Δ. Alternatively, one or more sections of a plurality of panels 812 may be combined to have a transverse length equal to Δ. In this way, the same panels 812 that are used as outer panels 812A may be employed as inner panels 812B by trimming one or more panels 812B to lessen the combined transverse dimension of panels by a length equal to Δ. Panels 812B may be trimmed according to any of the methods described herein and panels 812B may be the same as or substantially similar to any of the panels described herein.

In some embodiments, the number of panels 812B to be trimmed comprises a third number, $n_3$, of panels 812B. If the same amount is trimmed from each of the $n_3$ panels, the amount trimmed from each of the individual panels of the $n_3$ panels being trimmed panels may be determined by:

$$\Delta individual = \frac{2\pi(r_{outer} - r_{inner})}{n_3}$$

In other embodiments, a the transverse dimension trimmed from each of the trimmed panels 812B is not equal. In some embodiments, to allow for easy removal of a transverse length Δ, the edge-most section(s) have a transverse length equal to Δ. Accordingly, all panels 812A, 812B may comprise the same basic panel, trimmed to fit. In some embodiments, $r_{outer} - r_{inner}$ is a standard length. For example, and without limitation, $r_{outer} - r_{inner}$ may equal 6, 8, 10 or 12 inches or may equal 10, 15, 20 or 25 centimeters.

In some embodiments, insulation (e.g. rigid foam insulation and/or the like) may be placed adjacent the interior surfaces of panels prior to the introduction of concrete. After placement of insulation in this manner, concrete or other curable material may be introduced (e.g. into the interior of a lining system on an interior of the insulation). Since the insulation may have the effect of covering anchoring components 18, anchoring extensions may be provided that connect to one or more anchoring components 18 to protrude through the insulation (e.g. through apertures in the insulation) for anchoring into the concrete or other curable material. For example, the anchoring extension may comprise a receptacle substantially similar to female connector 34 with an extension spine extending in the inward outward connector. In some embodiments, the extension spine comprises one or more anchoring features, such as those discussed herein, for anchoring to concrete or other curable material poured over the insulation. The anchoring extensions may be attached to anchoring components using an adhesive to provide additional resistance to detachment of anchoring components 18 and the anchoring extensions.

As will be apparent to those skilled in the art in the light of the foregoing disclosure, many alterations and modifications are possible in the practice of this invention without departing from the spirit or scope thereof. For example:

Any of the connector components described herein can be used in conjunction with any of the forms described herein.

In the embodiments described herein, the structural material used to fabricate the wall segments is concrete. This is not necessary. In some applications, it may be desirable to use other structural materials which may be initially be poured or otherwise placed into forms and may subsequently solidify or cure. In some applications, it may be desirable to use other curable materials (e.g. curable foam insulation, curable protective material or the like) instead of, or in addition to, concrete.

In the embodiments describes herein, the outward facing surfaces of some panels (e.g. panels 12,112) are substantially flat. In other embodiments, panels may be provided with corrugations in inward-outward direction 24. Such corrugations may extend longitudinally and/or transversely.

In the embodiments described above, the various features of panels 12, 112 (e.g. connector components 34, 36 134, 136, etc.) are substantially co-extensive with panels 12, 112 etc. in the longitudinal dimension. This is not necessary. In some embodiments, such features may be located at various locations on the longitudinal dimension of panels 12, 112 etc.

In some embodiments, the forms described herein may be used to fabricate walls, ceilings or floors of buildings or similar structures. In general, the forms described above are not limited to building structures and may be used to construct any suitable structures formed from concrete or similar materials. Non-limiting examples of such structures include transportation structures (e.g. bridge supports and freeway supports), foundations, sidewalks, pipes, tanks, beams and the like.

Structures (e.g. walls) fabricated according to the invention may have curvature. Where it is desired to provide a structure with a certain radius of curvature, panels on the inside of the curve may be provided with a shorter length than corresponding panels on the outside of the curve. This length difference will accommodate for the differences in the radii of curvature between the inside and outside of the curve. It will be appreciated that this length difference will depend on the thickness of the structure.

In addition or in the alternative to the co-extruded coating materials and/or surface texturing described above, materials (e.g. sealants and the like) may be provided at various interfaces between the connector components described above to improve the impermeability of the resulting connections to liquids and/or gasses.

The description set out above makes use of a number of directional terms (e.g. inward-outward direction 24, transverse direction 16 and longitudinal direction 14). These directional terms are used for ease of explanation and for explaining relative directions. In some embodiments, the longitudinal direction 14 may be generally vertical and the transverse and inward-outward directions 16, 24 may be generally horizontal, but this is not necessary. Walls and other structures fabricated from the forms described herein need not be vertically and/or horizontally oriented like those described above. In some circumstances, components of the forms described herein may be assembled in orientations different from those in which they are ultimately used to accept concrete. However, for ease of explanation, directional terms are used in the description to describe the assembly of these form components. Accordingly, the directional terms used herein should not be understood in a literal sense but rather in a sense used to facilitate explanation and/or directions relative to one another.

Many embodiments and variations are described above. Those skilled in the art will appreciate that various aspects of any of the above-described embodiments may be incorporated into any of the other ones of the above-described embodiments by suitable modification.

While a number of exemplary aspects and embodiments have been discussed above, those of skill in the art will recognize certain modifications, permutations, additions and sub-combinations thereof. It is therefore intended that the following appended aspects and aspects hereafter introduced are interpreted to include all such modifications, permutations, additions and sub-combinations as are within their true spirit and scope.

What is claimed is:

1. A structure-lining apparatus for lining one or more surfaces of a structure formed from curable material cast in a form, the apparatus comprising:
   a plurality of panels each panel extending in substantially orthogonal transverse and longitudinal directions, the panels connectable at their respective transverse edges in edge-to-edge connections to provide a structure-lining surface extending in the transverse and longitudinal directions;
   a first panel of the plurality of panels comprising:
   a first connector component at a first transverse edge of the first panel;
   a second connector component, complementary to the first connector component, at a second transverse edge of the first panel;
   a third connector component, complementary to the first connector component, between the first and second transverse edges of the first panel;
   a fourth connector component, complementary to the first connector component, between and adjacent to the second and third connector components;
   a first breakaway component between the second connector component and the third connector component for shortening a transverse length of the first panel; a second breakaway component between the third connector component and the fourth connector component for shortening the transverse length of the first panel; and
   a second panel of the plurality of panels, the second panel extending in the transverse and longitudinal directions edge-adjacent to the first panel and lockingly connectable in an edge-to-edge connection to the first panel by:
   a first complementary connector component complementary and lockingly connectable to the first connector component of the first panel; or
   a second complementary connector component complementary and lockingly connectable to the second, third and fourth connector components of the first panel;
   wherein a transverse spacing between the second connector component and the fourth connector component is different than a transverse spacing between the third connector component and the fourth connector component; and
   wherein there are no intervening connector components between the second and fourth connector components and between the third and fourth connector components.

2. An apparatus according to claim 1 comprising a plurality of anchoring components which project from the first panel in an inward-outward direction orthogonal to both the transverse and longitudinal directions and into the curable material during fabrication of the structure when the curable material is a liquid, the anchoring components each comprising one or more anchoring features which extend in at least one of the longitudinal and transverse directions and which are at least partially encased in the material as the material solidifies to thereby bond the anchoring components to the structure.

3. An apparatus according to claim 1 wherein one or more of the first, second and third connector components project from the first panel in an inward-outward direction orthogonal to both the transverse and longitudinal directions and into the curable material during fabrication of the structure when the curable material is a liquid and wherein the one or more of the first, second and third connector components comprise one or more anchoring features which extend in at least one of the longitudinal and transverse directions and which are at least partially encased in the material as the material solidifies to thereby bond the one or more of the first, second and third connector components to the structure.

4. An apparatus according to claim 1 wherein the second connector component, the third connector component, the fourth connector component, and the first complementary connector component each comprise a male connector component and the first connector component and the second complementary connector component each comprise a female connector component, each of the male connector components lockingly receivable in each of the female connector components.

5. An apparatus according to claim 1 wherein the first breakaway component is located transversely adjacent to the third connector component.

6. An apparatus according to claim 1 wherein a transverse spacing between the first connector component and the third connector component is different than a transverse spacing between the third connector component and the fourth connector component.

7. An apparatus according to claim 1 wherein a transverse spacing between the fourth connector component and the second connector component is different than a transverse spacing between the third connector component and the first connector component.

8. An apparatus according to claim 7 wherein the second breakaway component is transversely adjacent to the fourth connector component.

9. An apparatus according to claim 1 wherein the first breakaway component comprises a pair of cutting guides and the pair of cutting guides comprises two longitudinally extending protrusions defining a cutting path therebetween.

10. An apparatus according to claim 1 wherein the second breakaway component comprises a pair of cutting guides and the pair of cutting guides comprises two longitudinally and inward-outwardly extending protrusions defining a cutting path therebetween.

11. An apparatus according to claim 9 wherein the cutting path comprises a scored line.

12. A structure-lining apparatus for lining one or more surfaces of a structure formed from curable material cast in a form, the apparatus comprising:
    a plurality of panels each panel extending in substantially orthogonal transverse and longitudinal directions, the panels connectable at their respective transverse edges in edge-to-edge connections to provide a structure-lining surface extending in the transverse and longitudinal directions;

a first panel of the plurality of panels comprising:
a first connector component at a first transverse edge of the first panel;
a second connector component, complementary to the first connector component, at a second transverse edge of the first panel;
a third connector component, complementary to the first connector component, between the first and second transverse edges of the first panel;
a fourth connector component, complementary to the first connector component, between and adjacent to the second and third connector components;
a first breakaway component between the second connector component and the third connector component for shortening a transverse length of the first panel;
a second breakaway component between the third connector component and the fourth connector component for shortening the transverse length of the first panel; and
a second panel of the plurality of panels, the second panel extending in the transverse and longitudinal directions edge-adjacent to the first panel and lockingly connectable in an edge-to-edge connection to the first panel by:
a first complementary connector component complementary and lockingly connectable to the first connector component of the first panel; or
a second complementary connector component complementary and lockingly connectable to the second, third and fourth connector components of the first panel;
wherein a transverse spacing between the second connector component and the fourth connector component is different than a transverse spacing between the third connector component and the fourth connector component;
wherein the second connector component, the third connector component, the fourth connector component, and the first complementary connector component each comprise a male connector component and the first connector component and the second complementary connector component each comprise a female connector component, each of the male connector components lockingly receivable in each of the female connector components;
wherein the male connector components each comprise a spine protruding from the first panel in the inward-outward direction and extending longitudinally, wherein the spine comprises a first protrusion, the first protrusion comprising a first transverse cross-section that is shaped substantially like an arrowhead.

13. An apparatus according to claim 12 wherein the spine comprises a second protrusion spaced apart from the first protrusion in the inward-outward direction, the second protrusion comprising a second transverse cross-section that is shaped substantially like an arrowhead.

14. An apparatus according to claim 12 wherein the second connector component comprises a second leg, the second leg comprising a transversely and longitudinally extending second portion of the first panel between a base of the spine of the second connector component and the second transverse edge of the first panel.

15. An apparatus according to claim 14 wherein the second connector component comprises a second foot extending longitudinally along an edge-most part of the second leg and protruding in the inward-outward direction.

16. An apparatus according to claim 15 wherein the first panel is cuttable at the first breakaway component to shorten the transverse length of the first panel and provide:
a third leg, the third leg comprising a transversely and longitudinally extending third portion of the first panel between a base of the spine of the third connector component and a new transverse edge of the first panel; and
a third foot extending longitudinally along an edge-most part of the third leg and protruding in the inward-outward direction, the third foot comprising a remaining part of the first breakaway component.

17. An apparatus according to claim 1 comprising a third breakaway component between the first connector component and the third connector component and transversely adjacent to the third connector component.

18. An apparatus according to claim 4 wherein the female connector components each comprise a first receptacle having a generally L-shaped transverse cross-section.

19. An apparatus according to claim 12 wherein each of the female connector components comprises a first receptacle, each first receptacle comprising a first cavity complementary in shape to the first protrusion.

20. An apparatus according to claim 13 wherein each of the female connector components comprises a first receptacle, each first receptacle comprising a first cavity complementary in shape to the first protrusion and a second cavity complementary in shape to the second protrusion.

21. An apparatus according to claim 20 wherein the first and second cavities are spaced apart from each other in the inward-outward direction by a neck portion.

22. An apparatus according to claim 21 wherein the neck portion is narrower in the transverse direction than a maximum transverse width of either of the first and second protrusions.

23. An apparatus according to claim 19 wherein the receptacle is resiliently deformed by extension of the male connector component into the receptacle and thereby applies a restorative force to the male connector component to maintain the edge-to-edge connection.

24. An apparatus according to claim 15 wherein each of the female connector components comprises a first receptacle having a generally L-shaped transverse cross-section and the first receptacle comprises a transversely extending cavity complementary in shape to the second foot.

25. An apparatus according to claim 1 wherein the first transverse edge of the first panel overlaps an edge-adjacent transverse edge of the second panel in the inward-outward direction.

26. An apparatus according to claim 1 wherein the first connector component comprises a first female connector component and the first complementary connector component comprises a first complementary male connector component and the edge-to-edge connection is formed between the first complementary male connector component and the first female connector component when one or more convexities of a receptacle of the first female connector component is received in one or more concavities of one or more protrusions of the first complementary male connector component.

27. An apparatus according to claim 4 wherein one of the male and female connector components of the first panel comprises a sealant that abuts a complementary connector component of the second panel when the edge-to-edge connection is formed between the one of the male and female connector components of the first panel and the complementary connector component of the second panel.

28. An apparatus according to claim 27 wherein the sealant is co-extruded with the first panel.

29. An apparatus according to claim 1 comprising a corner panel, the corner panel comprising a first portion which extends in the longitudinal and transverse directions and a second portion which extends in the longitudinal and inward-outward directions.

30. An apparatus according to claim 1 wherein the structure comprises first and second segments, each segment comprising one or more of the plurality of panels and the apparatus comprises a joint plug connected between the first and second segments, the joint plug comprising:
an outer surface which extends in the longitudinal and transverse directions; and
a plug stem which extends in the longitudinal and inward-outward direction into a space between the first and second segments.

31. An apparatus according to claim 1 wherein the structure is a cast-in-place structure that is cast in place where it will be used for its intended purpose.

32. An apparatus according to claim 1 wherein the structure is a precast structure that is cast in a first location and moved to a second location prior to being used for its intended purpose.

33. An apparatus according to claim 32 wherein the structure is a tilt-up wall.

34. An apparatus according to claim 1 wherein the first panel comprises an additional breakaway component between the first and third connector components and transversely adjacent to the third connector component and wherein breaking the first panel at the additional breakaway component comprises removing the first connector component from the first panel.

35. An apparatus according to claim 34 comprising a double connector, the double connector comprising a first double connector component connectable to the third connector component of the first panel and a second double connector component connectable to the first complementary connector component of the second panel thereby connecting the first and second panels.

36. An apparatus according to claim 35 wherein the first double connector component, the second double connector component and the first connector component each comprise female connector components and the third connector component and the first complementary connector component each comprise male connector components.

37. A method for lining one or more surfaces of a structure formed from material that is cast as a liquid and subsequently solidifies, the method comprising:
providing a form in which to cast the material;
providing first and second panels which each extend in substantially orthogonal transverse and longitudinal directions, the first panel comprising a first connector component at a first transverse edge of the first panel, a second connector component adjacent to and spaced apart from the first connector component by a first transverse length, a, and a third connector component adjacent to and spaced apart from the second connector component by a second transverse length, b, the second transverse length, b, different than the first transverse length, a;
shortening a transverse dimension of the first panel by the first transverse length, a, by breaking a first breakaway component of the first panel away from the first panel and thereby breaking away the first transverse edge including the first connector component from the first panel and creating a new first transverse edge of the first panel;
lockingly connecting the second connector component of the first panel to a complementary connector component of the second panel in an edge-to-edge connection at the new first transverse edge of the first panel and an edge-adjacent transverse edge of the second panel to provide a structure-lining surface extending in the transverse and longitudinal directions;
inserting the first and second panels into the form such that at least a portion of the structure-lining surface abuts against a corresponding portion of the form;
introducing liquid material into the form;
wherein lockingly connecting the first and second panels in the edge-to-edge connection comprises lockingly connecting a first connector component on the new first transverse edge of the first panel to a first complementary connector component on the edge-adjacent transverse edge of the second panel; and
wherein there are no intervening connector components between the first and second connector components and between the second and third connector components.

* * * * *